United States Patent
Aldridge et al.

(10) Patent No.: US 12,233,558 B2
(45) Date of Patent: Feb. 25, 2025

(54) ROBOTIC CONTROL FOR TOOL SHARPENING

(71) Applicant: Omnisharp, LLC, Round Rock, TX (US)

(72) Inventors: Russell Aldridge, Austin, TX (US); Marc Christenson, Austin, TX (US); Jacob Robinson, Round Rock, TX (US); Isaac Jones, Round Rock, TX (US); Joshua Foss, Pflugerville, TX (US); Mathius Jules, Pflugerville, TX (US); Michael Morgan, Round Rock, TX (US); Austin Christensen, Cedar Park, TX (US); Jason Orr, Pflugerville, TX (US); Nathan Powelson, Pflugerville, TX (US); Sam Grayson, Pflugerville, TX (US)

(73) Assignee: Omnisharp, LLC, Round Rock, TX (US)

( * ) Notice: Subject to any disclaimer, the term of this patent is extended or adjusted under 35 U.S.C. 154(b) by 0 days.

(21) Appl. No.: 17/697,173

(22) Filed: Mar. 17, 2022

(65) Prior Publication Data

US 2022/0203541 A1 Jun. 30, 2022

Related U.S. Application Data

(63) Continuation of application No. 16/786,838, filed on Feb. 10, 2020, now Pat. No. 11,312,017.
(Continued)

(51) Int. Cl.
*B25J 9/16* (2006.01)
*B25J 9/00* (2006.01)

(52) U.S. Cl.
CPC ........... *B25J 9/1679* (2013.01); *B25J 9/1612* (2013.01); *B25J 9/1697* (2013.01); *B25J 9/0093* (2013.01)

(58) Field of Classification Search
CPC ...... B25J 9/1679; B25J 9/1697; B25J 9/1612; B25J 9/0093; B25J 9/1664; B25J 11/0065;
(Continued)

(56) References Cited

U.S. PATENT DOCUMENTS 5,601,473 A * 2/1997 Strain ..................... B24B 3/003
451/10
9,079,284 B2 * 7/2015 Christenson .............. B24B 3/54
(Continued)

*Primary Examiner* — Robert T Nguyen
(74) *Attorney, Agent, or Firm* — Eversheds Sutherland (US) LLP

(57) ABSTRACT

This disclosure describes systems, methods, and devices related to robotic control for tool sharpening. The device may determine a first location associated with a first cutting tool of the one or more cutting tools relative to the first container. The device may grip the first cutting tool based on the first location of the first cutting tool relative to the first container. The device may move the robotic device to one more scanning sensors. The device may collect three dimensional data. The device may extract a profile of the first cutting tool. The device may determine a top edge and a bottom edge based on the profile. The device may determine a tip of the first cutting tool. The device may generate a sharpening path based on the tip and the profile of the first cutting tool.

20 Claims, 25 Drawing Sheets

Related U.S. Application Data

(60) Provisional application No. 62/803,237, filed on Feb. 8, 2019.

(58) Field of Classification Search
CPC ........... G05B 2219/37558; G05B 2219/45159; B24D 15/08; B24B 3/54; B24B 19/002
See application file for complete search history.

(56) References Cited

U.S. PATENT DOCUMENTS

| | | | |
|---|---|---|---|
| 11,099,618 B1* | 8/2021 | Morgan | G06F 1/203 |
| 11,312,017 B2* | 4/2022 | Aldridge | B25J 9/1679 |
| 2005/0064795 A1* | 3/2005 | Giurgiuman | B24B 3/34 |
| | | | 451/8 |
| 2005/0159840 A1* | 7/2005 | Lin | G05B 19/4163 |
| | | | 700/245 |
| 2008/0096477 A1* | 4/2008 | Lytinas | B24B 41/06 |
| | | | 451/349 |
| 2011/0222995 A1* | 9/2011 | Irie | B25J 9/1697 |
| | | | 700/218 |
| 2011/0281503 A1* | 11/2011 | Knecht | B24B 49/02 |
| | | | 451/5 |
| 2014/0114464 A1* | 4/2014 | Williams | G05B 19/409 |
| | | | 700/186 |
| 2017/0087690 A1* | 3/2017 | Vogel | B24B 3/54 |
| 2018/0236623 A1* | 8/2018 | Robinson | B24B 53/003 |
| 2019/0210177 A1* | 7/2019 | Graves | B24B 55/02 |
| 2019/0366499 A1* | 12/2019 | Rosenblatt | B24B 3/54 |
| 2020/0070297 A1* | 3/2020 | Lyons | B24B 3/54 |
| 2020/0246933 A1* | 8/2020 | Fowler | B24B 49/12 |
| 2023/0049183 A1* | 2/2023 | Kennedy | B24B 49/12 |

* cited by examiner

FIG. 23

ROBOTIC CONTROL FOR TOOL SHARPENING

CROSS-REFERENCE TO RELATED APPLICATION

This application is a continuation of U.S. application Ser. No. 16/786,838, filed Feb. 10, 2020, which claims the benefit of U.S. Provisional Application No. 62/803,237, filed Feb. 8, 2019, all disclosures of which are incorporated herein by reference as if set forth in full.

TECHNICAL FIELD

This disclosure generally relates to devices, systems, and methods for modifying cutting tools, more particularly, to robotic control for tool sharpening.

BACKGROUND

Cutting tools come in many shapes, sizes, and types, and may be sharpened according to their profiles. Machines may be used for sharpening these cutting tools. However, there is a need for automated sharpening of cutting tools using sophisticated robotic mechanisms via 3D profiling to achieve a better sharpening result regardless of the shape of the cutting tool.

BRIEF DESCRIPTION OF THE DRAWINGS

FIG. 23 depicts an illustrative schematic diagram for an analytics user interface, in accordance with one or more example embodiments of the present disclosure.

DETAILED DESCRIPTION

Figure 1:
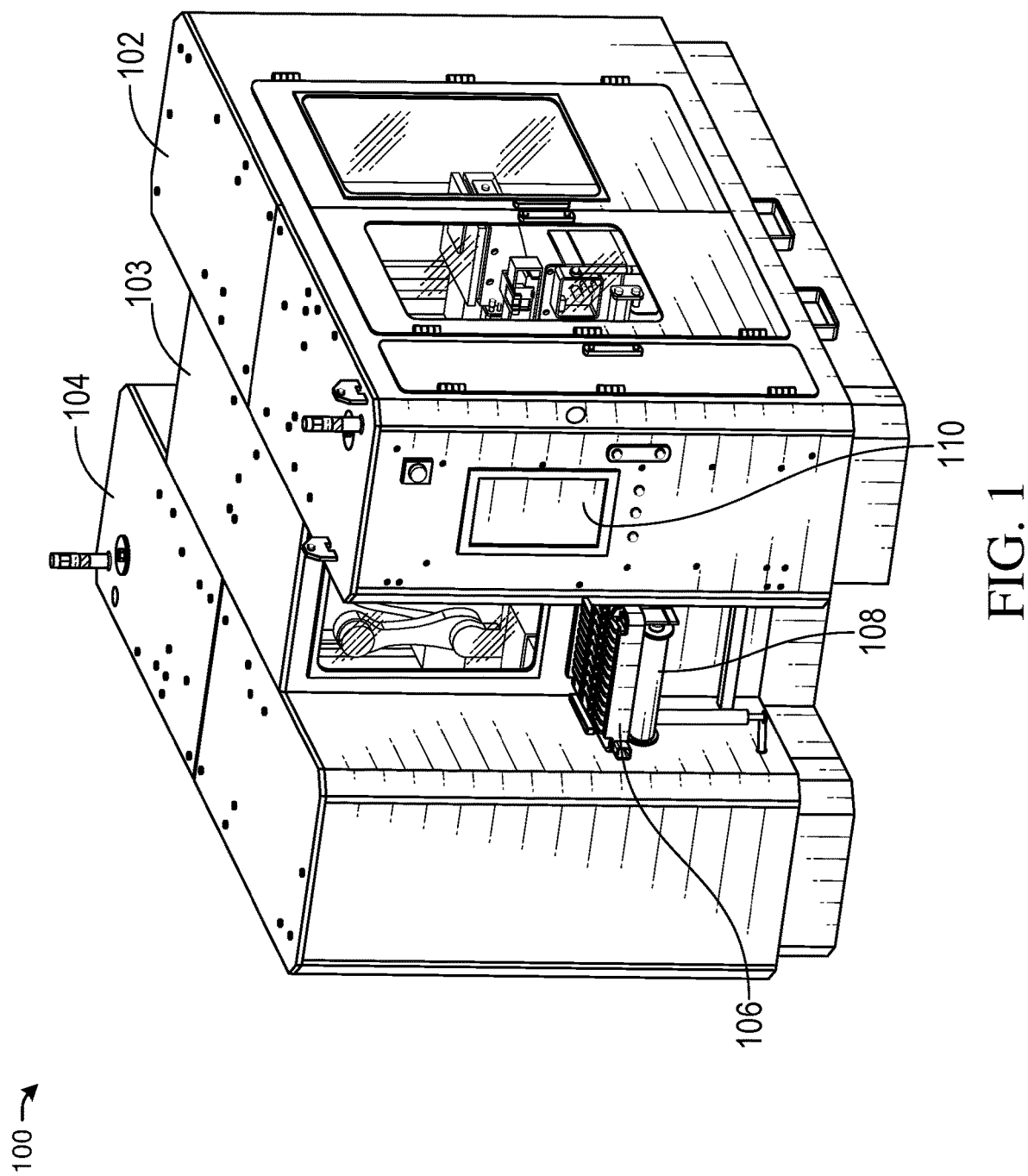
FIG. 1 illustrates an exemplary cutting tool sharpening system, according to some example embodiments of the present disclosure.

Example embodiments described herein provide certain systems, methods, and devices for sharpening cutting tools. The following description and the drawings sufficiently illustrate specific embodiments to enable those skilled in the art to practice them. Other embodiments may incorporate structural, logical, electrical, process, algorithm, and other changes. Portions and features of some embodiments may be included in or substituted for, those of other embodiments. Embodiments set forth in the claims encompass all available equivalents of those claims.

Machines may sharpen cutting tools. However, some sharpening machines may use belts to grind cutting tools rather than counter-rotating stones, for example. Some sharpening machines and methods do not scan an entire non-handle portion of a cutting tool of a three-dimensional object and instead may limit the scanning of cutting tools to a bottom edge of the blade of the cutting tool to achieve a two-dimensional profile of the bottom edge. Some sharpening methods and machines may make physical contact between a position sensor and the edge of a blade of a cutting tool to determine a profile of a cutting tool.

Example embodiments of the present disclosure relate to systems, methods, and devices for robotic control for tool sharpening.

The present disclosure includes a system used to sharpen cutting tools of various sizes and shapes. The system may sharpen cutting tools by manipulating the cutting tool, measuring the three-dimensional (3D) profile of the cutting tool, and grinding the cutting tool. For illustrative purposes, a knife will be used as an example of a cutting tool to illustrate the various embodiments of the robotic control for tool sharpening. However, it should be understood that any other cutting tools such as axes, saws, scissors, chisels, razors, or other cutting tools may be used. The system may be autonomous and may move, secure, release, identify, and facilitate the sharpening of the cutting tool. The system may include a robot capable of many degrees of motion (e.g., six degrees of motion, using multiple axes of rotation, etc.), a gripping mechanism, a force-torque sensor capable of many directions of force and/or torque, a 3D scanning subsystem, a loading subsystem, a user interface, an initial orientation scan subsystem, a data processing and robot control subsystem, and at least one grinding system having two counter-rotating grinding wheels. The system may automate the grinding process so that dull cutting tools may be placed into the loading system, sharpened by the system, and then ejected fully sharpened.

In one or more embodiments, the system may perform scanning of the object (e.g., a knife) as a 3D object to allow a more accurate sharpening compared to the 2D profile of some part of the knife. For example, scanning may involve one or more sensors situated in a fashion to capture a 3D object of the knife to allow a robotic control device to load the knife and pass it through a grinding process that includes feedback from a force-torque sensor that may result in the movement of the knife in various directions based on the sensed force during the grinding process.

In one or more embodiments, the operation of the automated sharpening system may begin as a user loads a system with the cutting tools placed in a container that holds the cutting tools in a consistent orientation (e.g., relative to one another). Once the system is loaded, an operator may utilize a user interface to initiate a grinding process, and the conveyor may move a cutting tool container holding the cutting tools such that a cutting tool is positioned in a pick-up location of one or more pickup locations that may be predetermined based on a tray used to hold the cutting tools. When the cutting tool is in the pick-up location, the robot may grip the cutting tool such that the edge of the cutting tool to be sharpened remains exposed. The robot may execute a linear move past an array of proximity sensors placed on a line perpendicular to the direction of motion and parallel to the longitudinal axis of the tool edge in order to facilitate the scanning process to generate a 3D rendition of the cutting tool. This movement may result in the capture of one or more points along the edge and top of the cutting tool (e.g., the number of points may be based on the number of proximity sensors in the array of sensors). The initial shape of the cutting tool may be considered by the system in order to determine the position and orientation needed to bring the cutting tool into the center of the focal area of the 3D scanning system.

In one or more embodiments, the robot may move the cutting tool to the 3D scanning area and may perform a 3D scan of the cutting tool. Using data from the multi-dimensional scan, the control system may determine whether the hollow grinding of the cutting tool is appropriate. Hollow grinding may cause a grinding wheel to take a concave portion out of the blade based on the thickness of the cutting tool. For example, if the thickness of the cutting tool (e.g., a knife) near the edge is larger than a preset threshold and a hollow grinding machine is installed, then the robot may proceed to hollow grind the cutting tool followed by honing the tool on a honer grinding machine. The preset threshold may be determined based on the circumference of the grinding wheel, user settings, type of cutting tool, or any other condition. If the thickness of the cutting tool is less than the threshold, then the robot may proceed directly to the honer machine. Honing realigns the knife's edge by bringing the edge of the knife back into alignment through the use of the honer machine. The 3D scan data may be considered to determine a robot grind path using a measured tool edge profile. If the scan data results in a tool that is out of range or has been ground down to a limit, the robot may move the cutting tool to a reject location for collection and may proceed to load another cutting tool from the tray. Otherwise, the system may continue with the force-controlled grinding of the cutting tool.

In one or more embodiments, once the robot has positioned the cutting tool over the grinding wheels, the system may lower the cutting tool using a force-controlled move that stops when the force-torque sensor registers a force above a certain value. For example, the robot may begin in the orientation appropriate for placing the tip of the cutting tool on the grinding stones, but possibly offset from the grinding stones (e.g., by 30 mm or another value). The robot may lower the cutting tool until the force torque sensor registers at a predetermined value (e.g., 0.5 N), at which time the robot may start moving through a regular grind motion. That is the robot does not start moving through the grind motion until the predetermined value received by the force torque sensor is reached. The algorithm for the system may account for gravity during the force feedback grind. The force-controlled movements allow the robot to vary the force applied during the grinding mechanism based on the feedback received as the cutting tool is being ground on the grinding stones. In that sense, the robot arm may move in small movements in all directions.

In one or more embodiments, the robot may move through the grinding path, which ensures that the contacting point along the edge profile remains tangent to the grinding surface. Throughout the grinding move, a vertical grinding force may be maintained by relying on data from the force-torque sensor. Any measured deviations from the desired grinding force may be actively countered with an applied torque from the robot using a proportional-derivative-integral (PID) control algorithm or another type of control algorithm. While the vertical force is being controlled, any variation in the horizontal position of the grinding stones may be compensated for with a PID control loop around the horizontal force. If the horizontal force deviates from the desired value (e.g., usually zero), then the robot may adjust by moving in the horizontal direction. The control method may be applied through a preset number of grinding passes from tip to heel and back to tip at a set or variable velocity. The variable velocity may be based on a state of the knife from the 3D scan.

In one or more embodiments, to make corrective moves and control the motion based on the forces applied to a cutting tool, the robot may need to be actively controlled. Active control of the robot may be accomplished using a real-time controller which may communicate with a robot controller to define the robot position for every clock cycle, for example. Because the PID control loop and force/torque data acquisition may be executing on the real-time controller, the grind path calculated from the scanner data may be adjusted as the points are sent to the robot controller.

In one or more embodiments, grinding may conclude at the tip of the cutting tool, and the robot may move the cutting tool off of the stones. The cutting tool may be manipulated back to the holding container and deposited in or on the holding container. The robot may grasp and lift another cutting tool and repeat at least some of the process of scanning and grinding. Once a container of cutting tools is completed (e.g., any or all cutting tools have been examined and operated on accordingly), the holding container may be removed manually or by the robot from the robot workspace where an operator or another machine may retrieve the holding container. The removal of a holding container may occur while the system continues to sharpen more cutting tools and thus requires no downtime to load and unload the system.

In one or more embodiments, after a preset number of grinds, the grinding stones may become filled with particles from the cutting tools being ground. The stone may also become worn down from contact with the tools. The stones may be dressed using a pair of diamond dressing stones. Dressing may be performed automatically using one or more motors that control the motion of the grinding stones and the diamond dressing stones. The grinding stones may be moved apart from one another until they reach an outer limit. The diamond dressing stones may be moved forward while the grinding stones are spinning. As the dressing stones move forward and backward, they may make contact with the spinning grinding stones and remove some material. Once the dressing stones have moved forward and then back to their initial position, the grinding stones move inward back to their original position, slightly adjusted for a change in diameter caused by the dressing. The adjustment feature ensures that the grind angle is consistent even after dressing.

In one or more embodiments, the system may be controlled via a touch screen user interface that may allow operators to manually move the conveyor and the robot, as well as toggle other actuators on the system. There are also a number of thresholds and settings that the user may adjust as needed. For example, the intensity of the grind may be adjusted using the interface to meet the needs of specific tools and various sharpness requirements.

In one or more embodiments, the system may comprise a built-in sharpness testing. This may be useful in knife tracking to help the customer to improve processes. For example, if knives come in sharp, the system may use the sharpness testing to determine that the knife does not need to be sharpened. Further, the system may use the built-in sharpness testing, measure the sharpness of a knife on exit to validate the sharpening has successfully occurred. The system may also track how users maintain the knives' edge, which may be useful for determining who requires training. Currently, in order to perform knife sharpness testing, a user may have to manually swap each knife out and align each knife, which results in slow and manual interactions with the operator.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 illustrates an exemplary cutting tool sharpening system 100, according to some example embodiments of the present disclosure.

Referring to FIG. 1, the cutting tool sharpening system 100 may include a primary module 102, a secondary module 104, a knife tray 106, a conveyor 108, and a touch screen 110.

In one or more embodiments, there may be multiple different configurations of the system 100 depending on knife grinding needs and throughput. The configurations may include: Primary Module 102, Primary Module 102+Conveyor 108, Primary Module 102+Conveyor 108+Queuing System, Primary Module 102+Secondary Module 104+Conveyor 108, and Primary Module 102+Secondary Module 104+Conveyor 108+Queuing System.

In one or more embodiments, the system may be modular. For example, the system 100 may be configured to have one robot with a honer, a hollow grinder, a deburr and/or polish machines. The system 100 may add a second module having a second robot, a second honer, and a second hollow grinder (and a deburr and/or polish machines). The control system may control both modules by communicating with both modules. One option (e.g., option 1) may include one robot, one hollow grinder, one honing grinder, and a scanner. In this option, a user may place a tray of knives in a centralized docking location that allows the robot to pick up knives from the knife tray 106. Another option (e.g., option 2) may include the components of option 1 and may add a conveyor 108 to move the tray of knives to be queued up in front of the robot. Another option (e.g., option 3) may include the components of option 1 and option 2 and may add a queuing system installed on the entrance and exit of the conveyor 108. This queuing system may allow a user to stack a number of knife trays at the entrance of the conveyor to increase the queued up amount of trays. Another option may (e.g., option 4) may include the components of option 1 and option 2, and may add a secondary module 104. The secondary module 104 may include a robot, a honer, and a hollow grinder. A user may place a knife tray 106 at the entrance of the conveyor 108 in this option. Another option (e.g., option 5) may include the components of option 1, option 2, and option 4, and may add the queuing system as in option 3. Other combinations of components of the options may be possible.

It is understood that the above descriptions are for purposes of illustration and are not meant to be limiting.

To sharpen knives, system 100 may use multiple grinders. A knife should be hollow ground if the blade needs to be thinned. A process for sharpening a knife may include the following steps: Hollow grind the knife, hone the knife, and then polish or deburr the knife. Hollow grinding is done to thin the blade so that an edge can appropriately be applied with honing. Honing the knife is done to sharpen the primary edge of the blade. Polishing/deburring is done to remove any imperfections or burrs on the blade.

Figure 2:
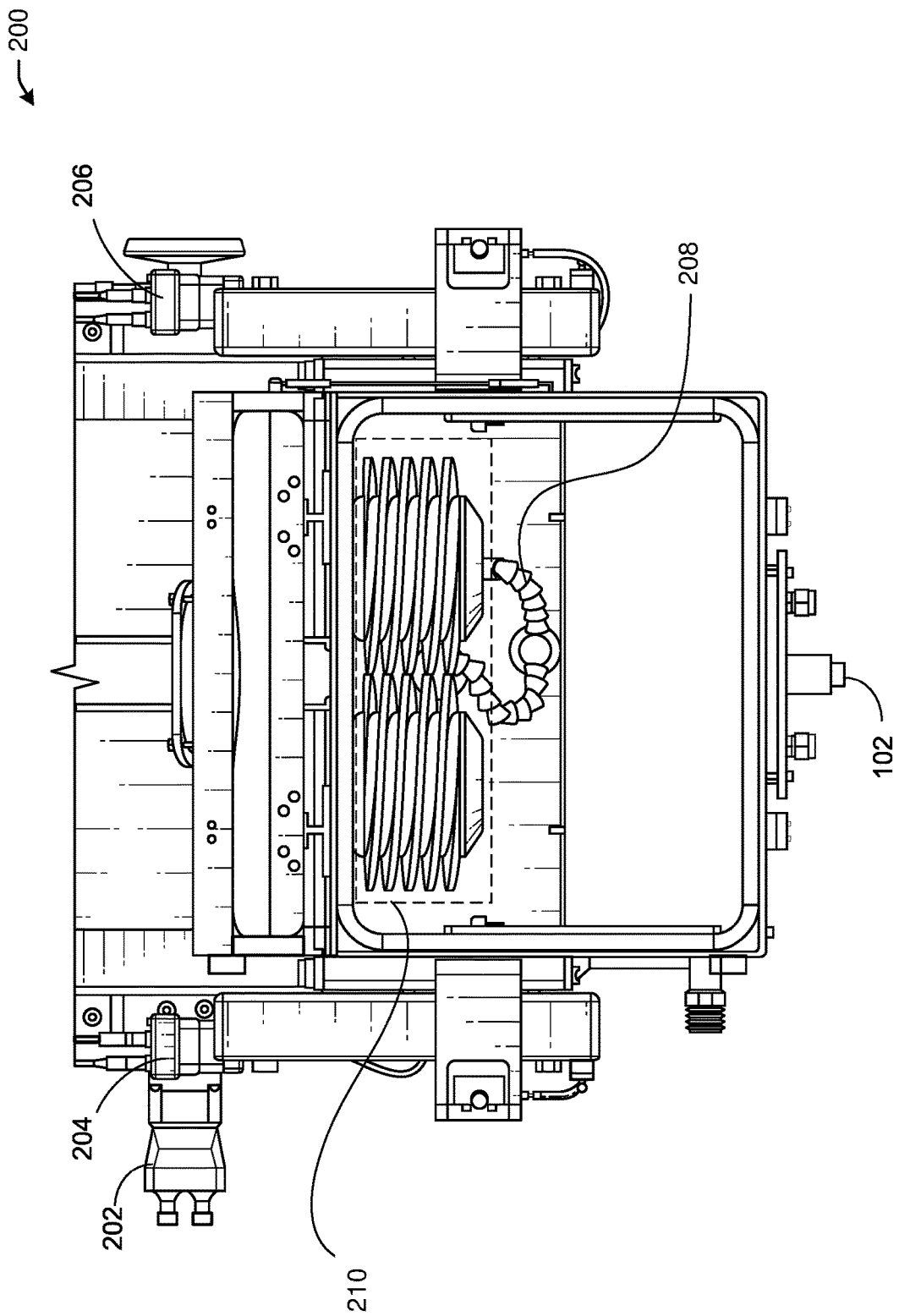
FIGS. 2 and 3 show the components for the honing grinder, according to some example embodiments of the present disclosure.
Figure 3:
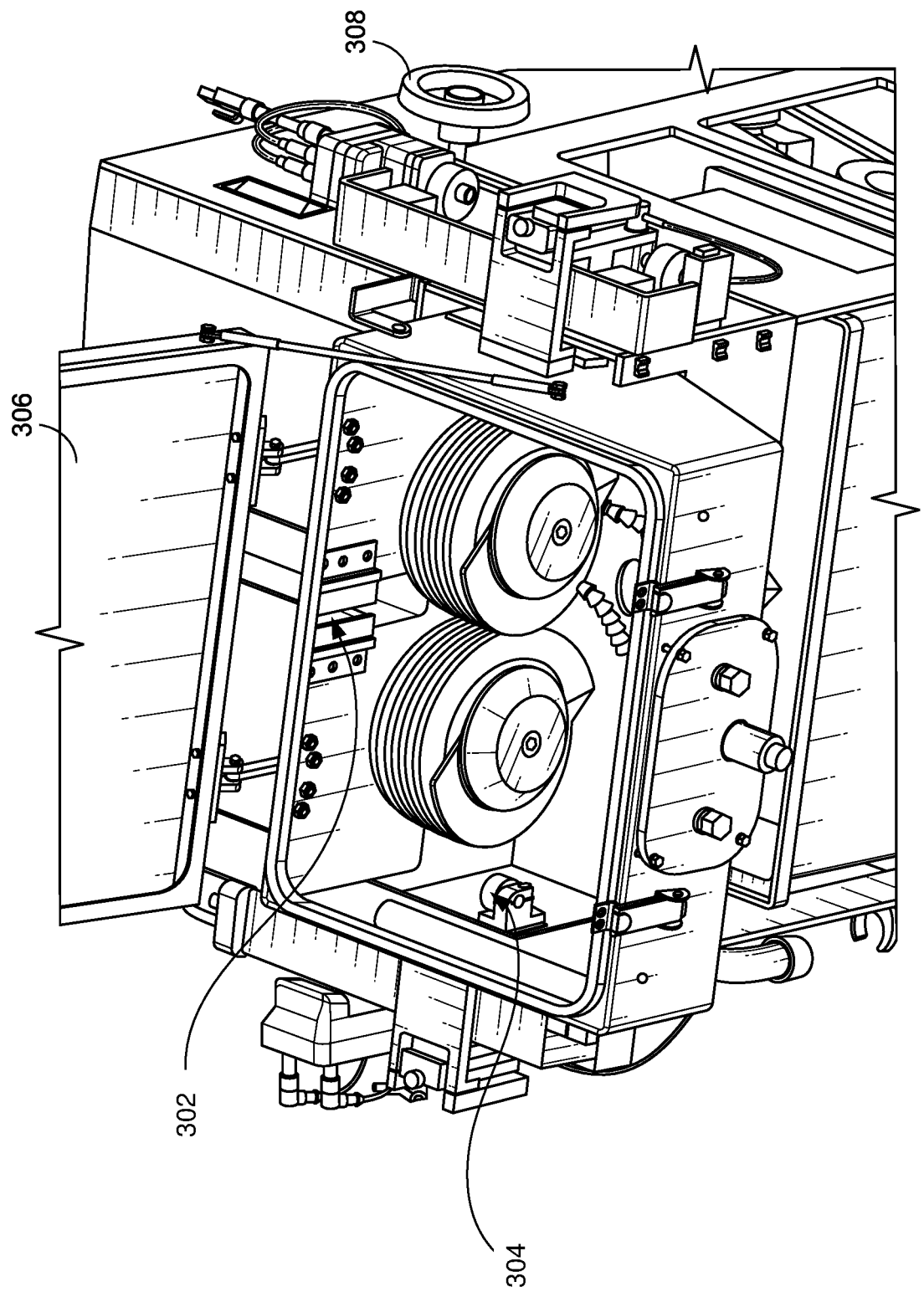

FIGS. 2 and 3 show the components for the honing grinder, according to some example embodiments of the present disclosure.

Referring to FIG. 2, there is shown a separation motor 202, two dressing stone motors 204 and 206, in addition to two ceramic grinding stones 210, which are cooled and lubricated using a water spray nozzle 208.

Referring to FIG. 3, there is shown a perspective view of the honing grinder, where an opening 302 is shown that allows the robot arm to insert the cutting tool in order to be placed in the path of the ceramic grinding stones to grind the cutting tool. The honing grinder may also comprise a diamond dressing stone 304, which may be used to clear debris accumulated on the grinding stones 210 after some usage. The entire compartment where the opening, the ceramic grinding stones 210, the diamond dressing stone 304 may be covered using a lid 306.

Figure 4:
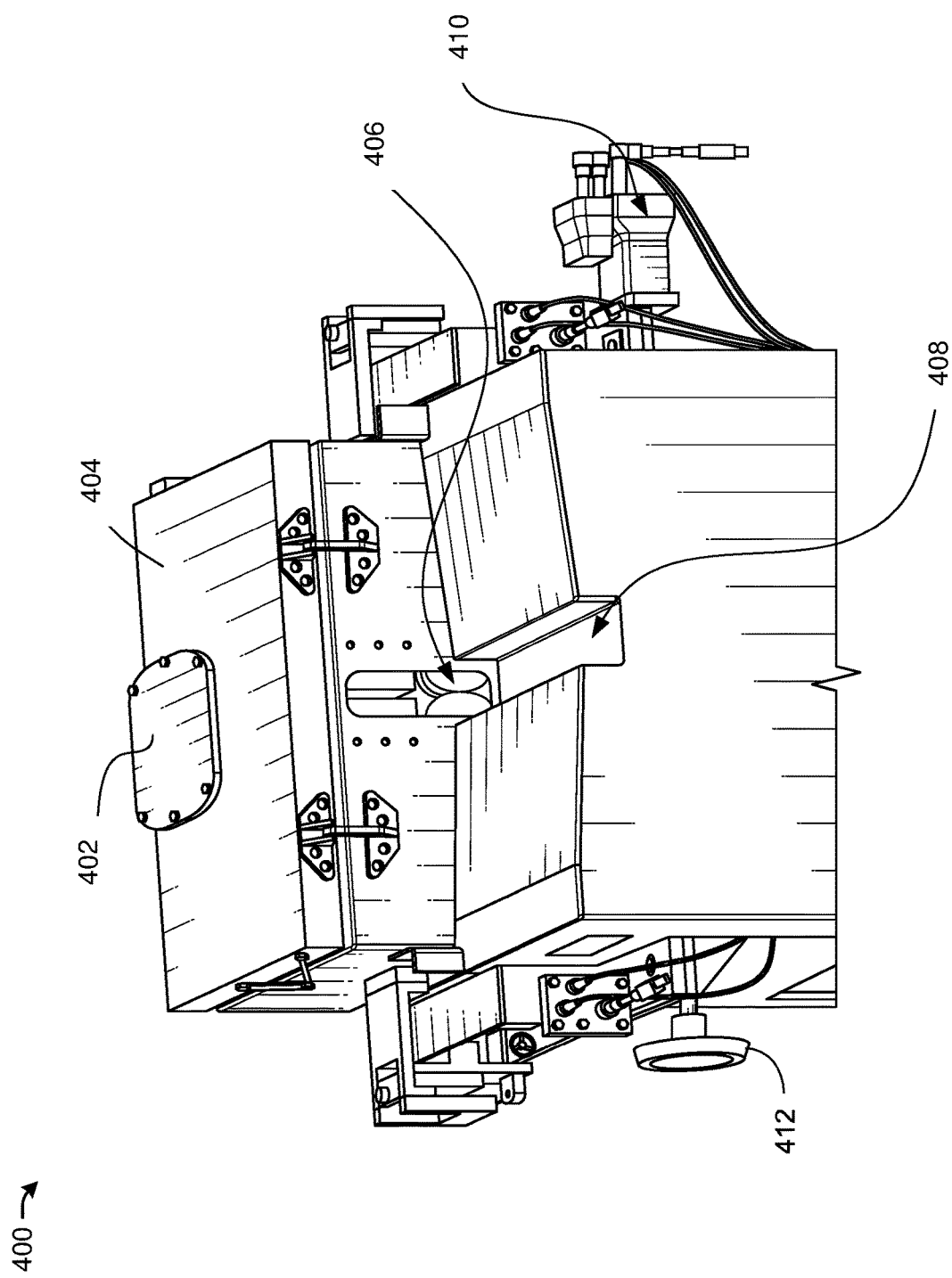
FIG. 4 shows the components for a hollow grinder, according to some example embodiments of the present disclosure.

FIG. 4 shows the components for a hollow grinder 400, according to some example embodiments of the present disclosure.

Referring to FIG. 4, there is shown a viewpoint 402 to allow the operator to view the hollowing process, a lid 404, a pair of ceramic grinding stones 406 to perform the hollowing process, a grind site entrance 408 where a cutting tool may be inserted using a robot arm, a separation motor 410, and a separation motor manual adjust 412.

In one or more embodiments, the hollow grinder 400 may have all the same components as a honing grinder, may use a different ceramic or CBN (Cubic Boron Nitride) grinding stones to sharpen the blade.

In one or more embodiments, the hollow grinder 400 is shown with all of the components to rotate the grinding stones. The hollow grinder may include the hardware to automate the process to dress the stones.

In one or more embodiments, polishing the stones may be performed by replacing the grinding stones with polishing wheels. To deburr a knife, the knife may run across sharpening steel or deburring wheels.

In one or more embodiments, after a number of knives have been sharpened, both the hollow grinding and honing stones may become filled with metal particles. The stones may need to be dressed. Dressing is a procedure for any sharpening stones in the material removal and sharpening industries. The process to dress the stones may be automated by moving a diamond dressing stone across the face of the grinding stones. The diamond dressing stone may be moved with a ball screw and motor. The diamond dressing stone may be manually aligned vertically with an adjustment knob. The dressing stone may be aligned and adjusted vertically when installing grinding stones for the first time to align the dressing stone with the grinding stone. Once the dressing stone is aligned, the system may automatically dress the stones by removing a prescribed amount of material from the grinding stones. The amount of material removed may variable and may be programmed down to a small amount (e.g., 0.001 inches). To start dressing the stones, an operator may select a specific grinder on the touch screen user interface (UI) and select to start the dressing process. Once the dressing process has started, the software may cause automatic removal of the amount of material programmed to be removed. The removed material can be calculated based on the number of knife runs or may be based on a fixed number of runs.

Figure 5:
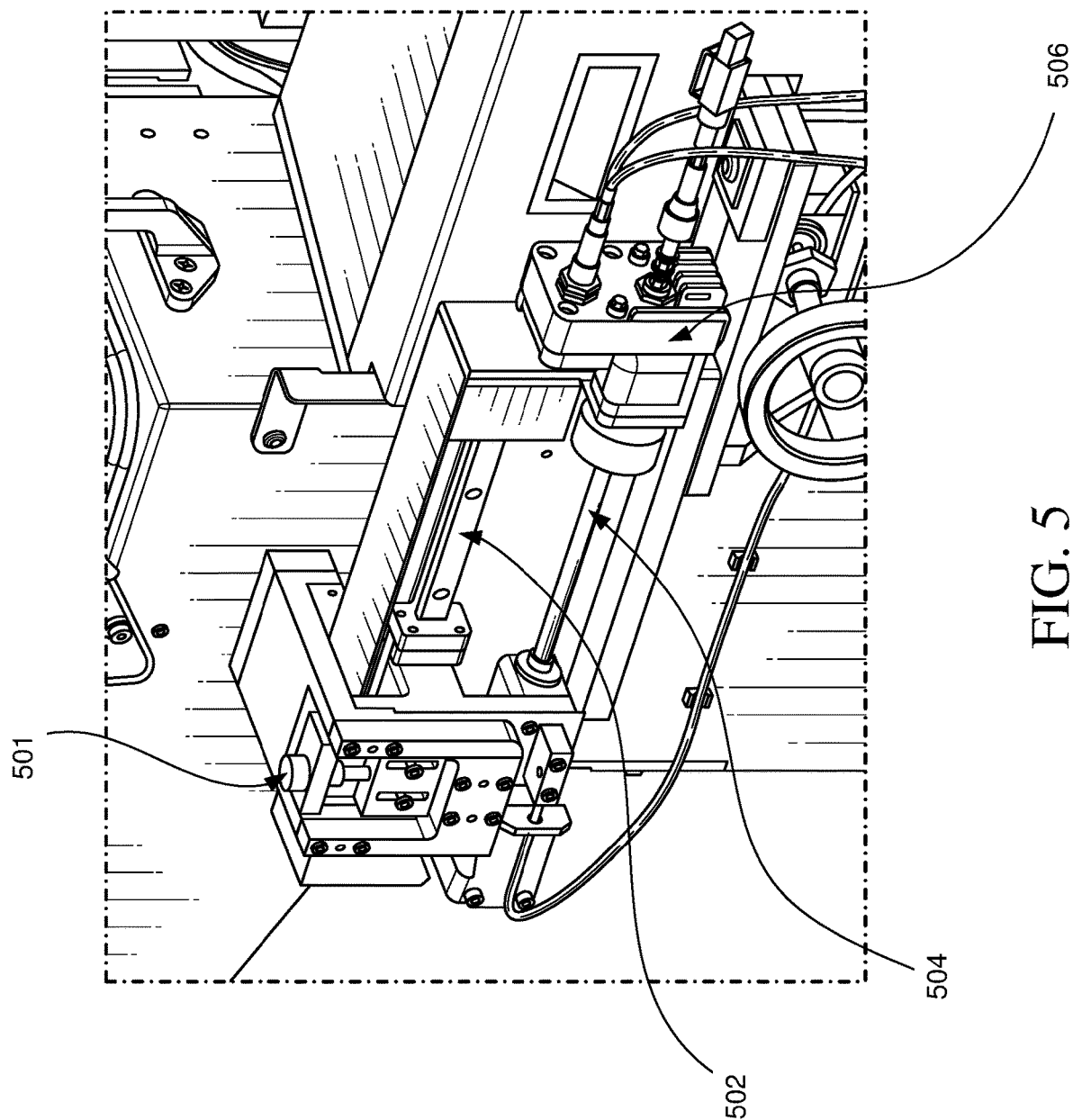
FIGS. 5 and 6 depict illustrative schematic diagrams for a system for dressing stones, in accordance with one or more example embodiments of the present disclosure.
Figure 6:
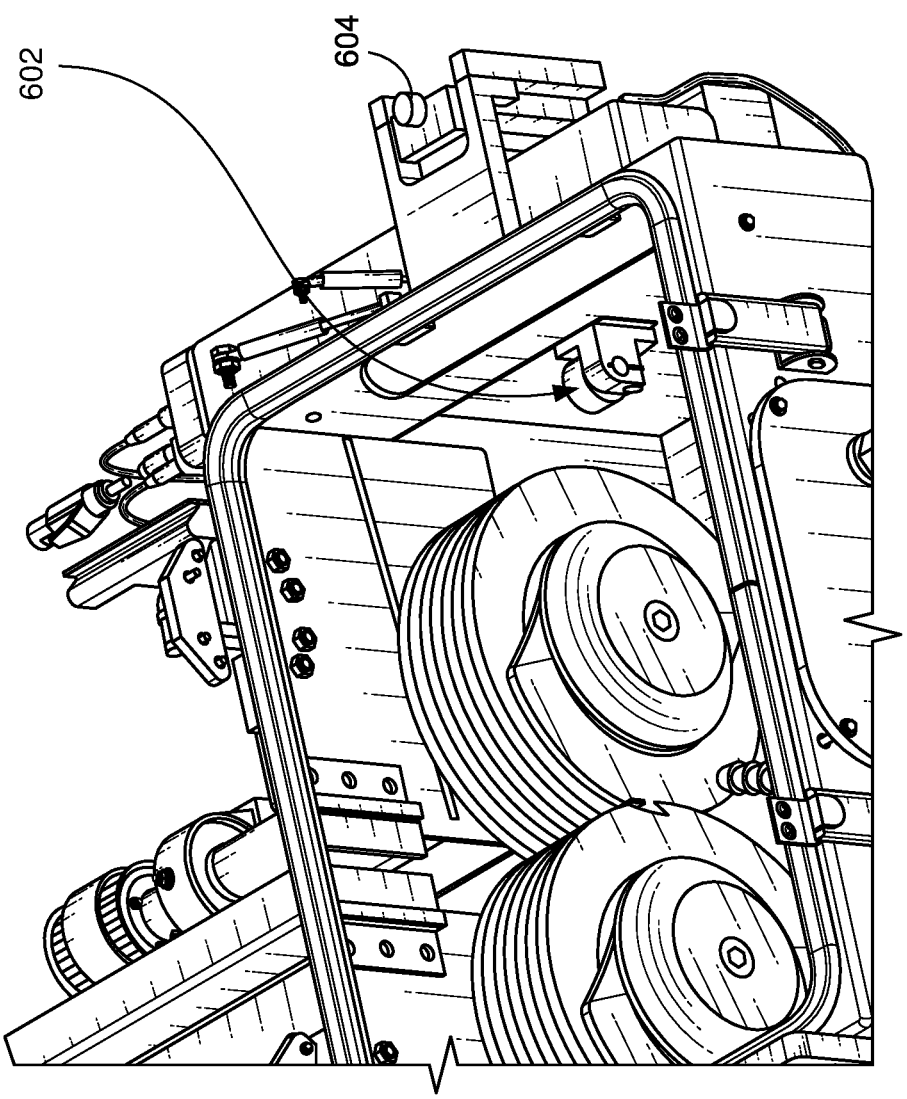

FIGS. 5 and 6 depict illustrative schematic diagrams for a system for dressing stones, in accordance with one or more example embodiments of the present disclosure.

Referring to FIG. 5, there is shown a vertical alignment known for diamond dressing stone 501, a linear alignment rail 502, a ball screw 504, and a motor 506.

Referring to FIG. 6, there is shown a diamond dressing stone 602 and a vertical adjustment knob 604 for diamond dressing stone.

In one or more embodiments, a robot may include multiple pieces of hardware, including the robot, a controller, and/or a pendant. The robot may be a six-axis robot arm or another type of robot. The controller may be a controller capable of controlling the robot arm or another type of controller, and the pendant may be a teach pendant or another type of pendant. The robot controller may run software programs to perform necessary movements (e.g., EKI, RSI software protocols).

In one or more embodiments, located on the end of a robot may be a mechanical assembly called the gripper. The gripper may also be called the end effector or end of arm tooling. The gripper may refer to a tool that interfaces with the knives that will be sharpened. The gripper may be designed to pick up a knife and hold it rigidly in place while the knife is being ground. The gripper may be designed to interface with the tray and the scanner. Fingers on the gripper may be spaced so that they fit between the alignment rows of the tray. The gripper may include a fiducial feature on both sides of it to be used for calibrating the scanner to the robot. The fiducial may refer to a machined geometric shape that may be scanned by the scanner, and then the scanner may be correlated in space to the robot and gripper. The gripper may include spring tabs to allow for rough alignment when picking up a knife. When the gripper moves to the tray to pick up a knife, the gripper may use the spring tabs to roughly align the knife to the gripper fingers. For larger knives, the gripper may include a spring system to depress the back of the handle to rotate until it sets level. This allows for a consistent pickup of the knife.

Figure 7:
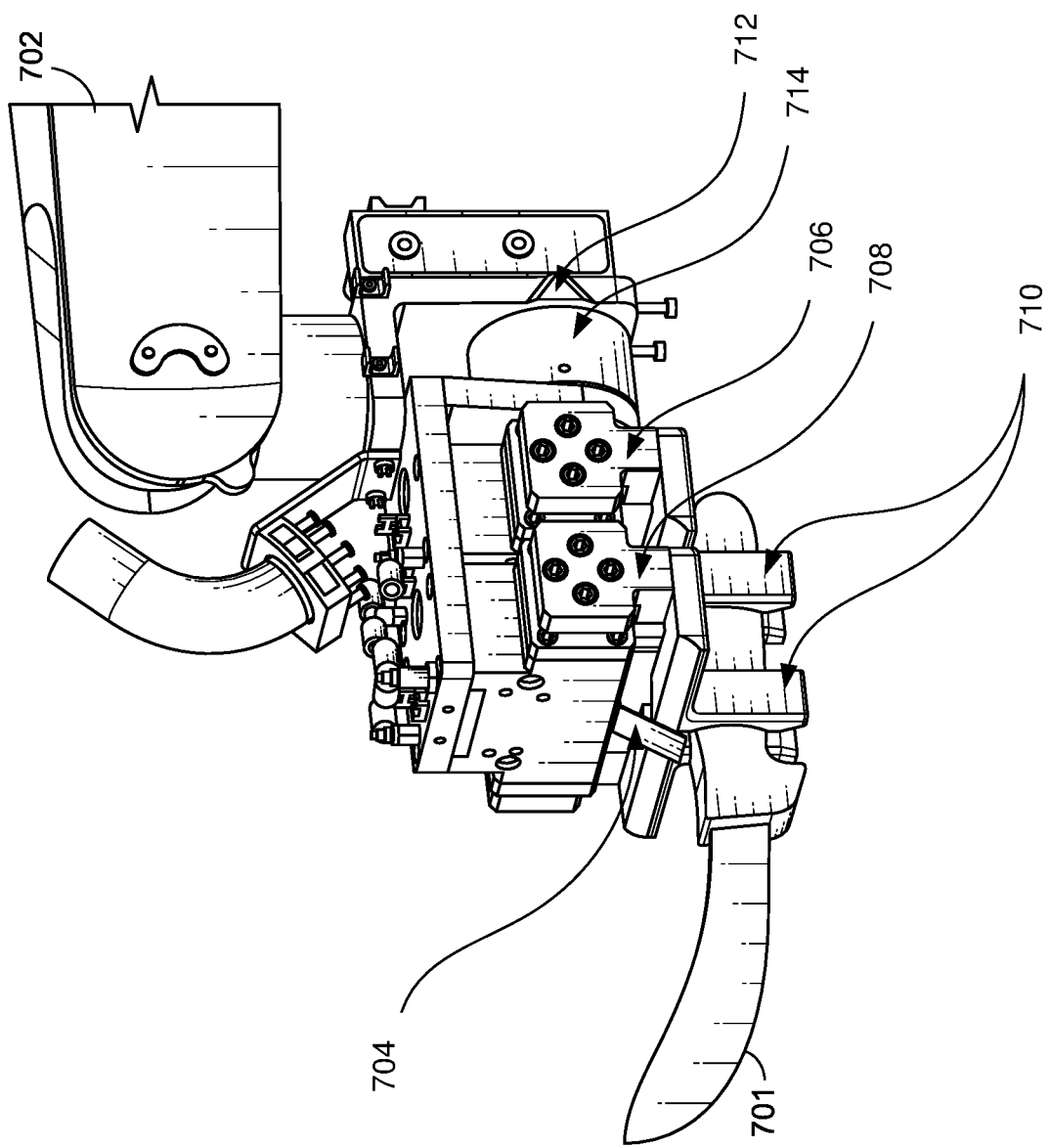
FIG. 7 depicts an illustrative schematic diagram for pneumatic Schunk grippers in accordance with one or more example embodiments of the present disclosure.

FIG. 7 depicts an illustrative schematic diagram for pneumatic Schunk grippers in accordance with one or more example embodiments of the present disclosure.

Referring to FIG. 7, there is shown a robot arm 702 gripping a cutting tool (knife 701) using gripper fingers 710. There is also shown a Schunk pneumatic actuators 706 and 708, a force and torque load cell sensor 714, and a scanning fiducial 712.

In one or more embodiments, the gripper may use an actuator to close the fingers rigidly on the handle of the knife. The actuator may be opened and closed by compressed air and may be controlled with pneumatic valves. The actuators may have sensors to show when the actuator is opened or closed.

In one or more embodiments, a sensor mounted on the gripper may be a force and torque sensor capable of sensing forces in three different axes and torques in three different axes. The sensor may be mounted behind the knife so that when the knife is grinding, the sensor may be able to measure the force applied on the knife. The sensor may include multiple sensors.

In one or more embodiments, the conveyor may be designed to move trays of knives from the outside of the machine into the machine and into place for the robot to reach the knives. The conveyor may be a water-resistant wash-down rated conveyor which may be used in food-grade and wet environments, for example. The conveyor may be driven by a motor and may use proximity sensors to determine when a tray is located at the beginning or end of the conveyor. A proximity sensor may be centrally located and may indicate when the tray is aligned in the locking position. There may be a pair of thru-beam sensors to detect if a knife is misplaced in the tray and/or is positioned up too high. A thru-beam sensor may be tripped in the event a knife is not placed properly in the tray.

Figure 8:
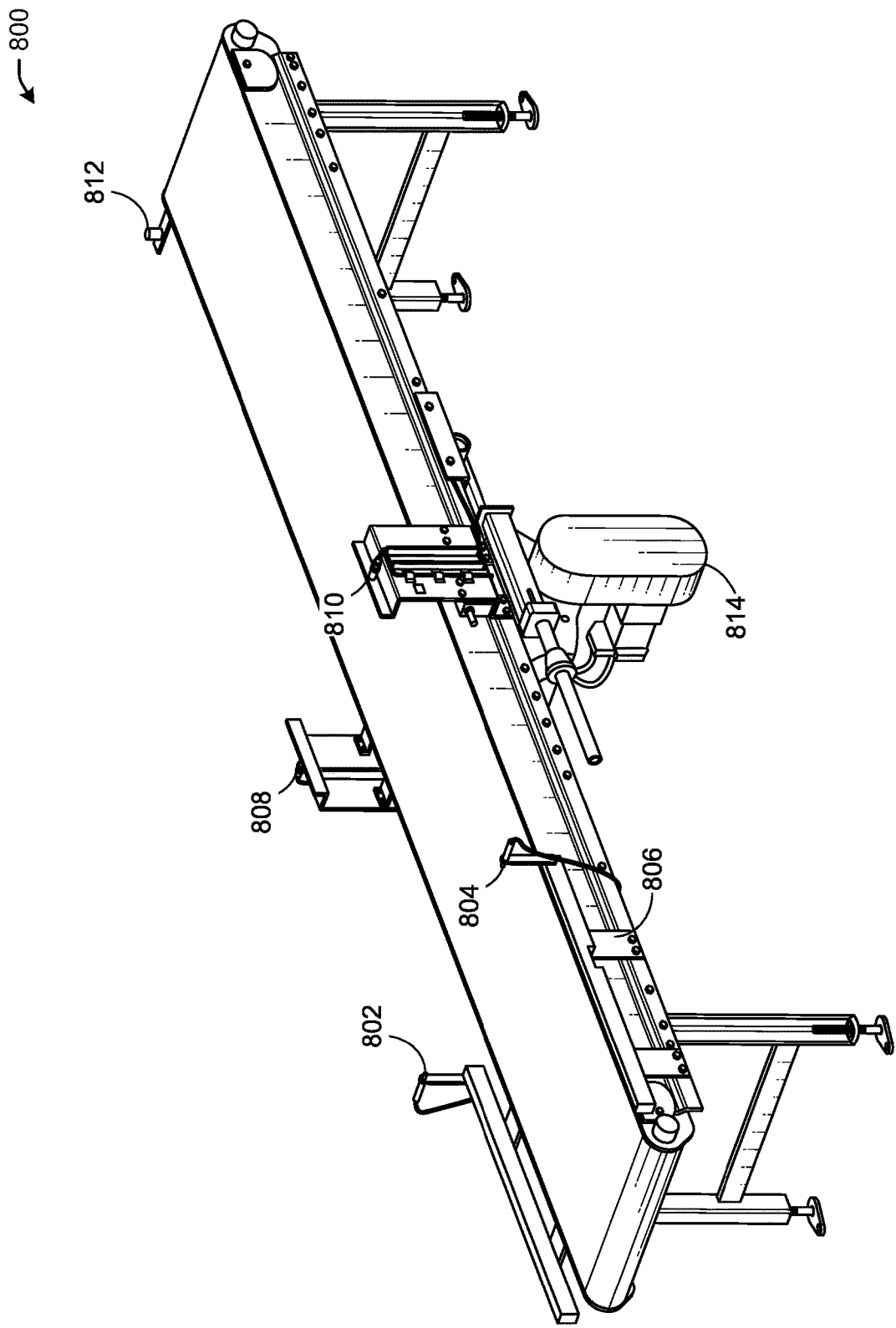
FIG. 8 depicts an illustrative schematic diagram for a conveyor, in accordance with one or more example embodiments of the present disclosure.

FIG. 8 depicts an illustrative schematic diagram for a conveyor, in accordance with one or more example embodiments of the present disclosure.

Referring to FIG. 8, there is shown conveyor 800 that is equipped with a pair of tray knife height thru-beam sensors 802 and 804, a proximity sensor 806 to recognize when the tray is at the start of the conveyor, a pair of proximity sensors 808 and 810 to recognize when the tray is in a locating home position, and a proximity sensor 812 to recognize when the tray is at the end of the conveyor. Further, there is shown a drive motor 814 that is capable of moving the conveyor belt.

In one or more embodiments, a knife tray may be made from a durable plastic that may be high temperature and water-resistant. The knife tray may be designed to hold knives in a fixed and repeatable location to guarantee its location for the robot to pick up accurately. The tray may be designed to hold multiple knives (e.g., 24 knives or another number). The tray may be designed to align a large assortment of knives. Knives may rest on respective points of the handle and on the knife blade. A blade may rest in a slot to fully align and constrain the knife. The bottom of the tray may include multiple alignment inserts to locate the tray on the conveyor. The inserts may meet with the pneumatic cylinders and locating pins. The bottom of the tray may be designed to allow any liquids that drip off the knives to drip off of the tray. The tray may not collect any water, coolant, or liquid, for example. The knife tray may also be modular and may support a wide variety of knives. The knife tray may also have visual fiducials for the detection of tray orientation. The trays may also have a stacking feature which allows easy stacking of the trays.

Figure 9:
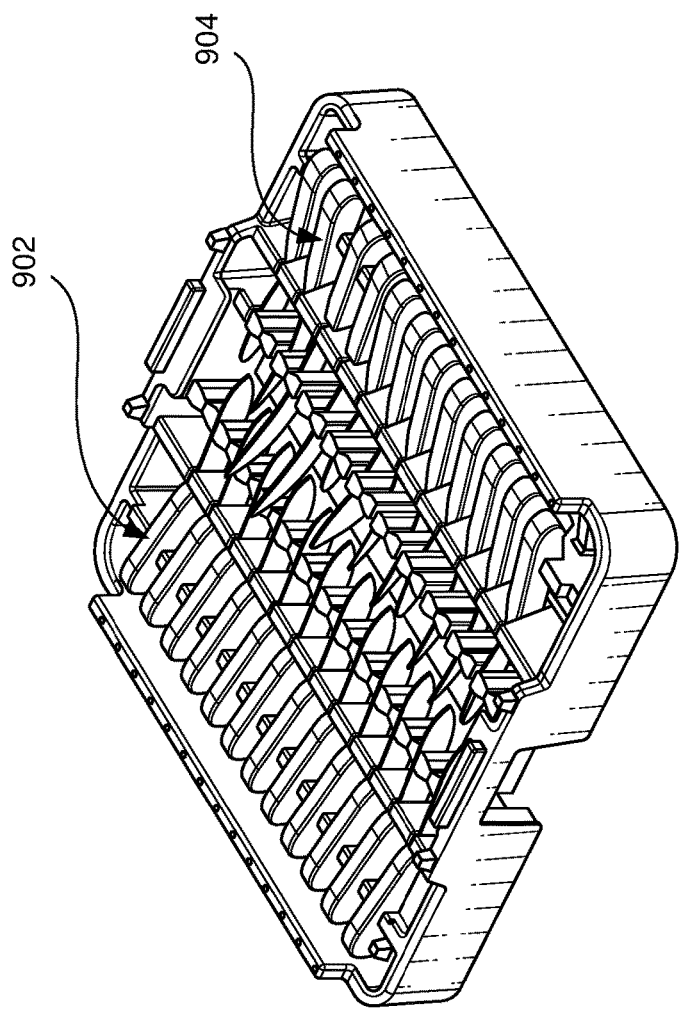
FIG. 9 depicts an illustrative schematic diagram for a knife tray, in accordance with one or more example embodiments of the present disclosure.

FIG. 9 depicts an illustrative schematic diagram for a knife tray 900, in accordance with one or more example embodiments of the present disclosure.

Referring to FIG. 9, there is shown slots being occupied with knives 902 in a first portion of the knife tray 900, referred to herein as TRAY 1, and slots occupied with knives 904 in a second portion of the knife tray 900, referred to herein as TRAY 2.

In one or more embodiments, the conveyor may move the tray to the center of the machine, where the tray may be locked into place using pneumatic cylinders and locating pins. Once locked into place, a robot may reach any knife in the tray and pick up any knife. This position is sometimes referred to as the tray-locked home position. In some embodiments, a vision system using a camera may take an image of the tray. For example, fiducials on the tray allow the system to adjust for any misalignment of the tray.

Figure 10:
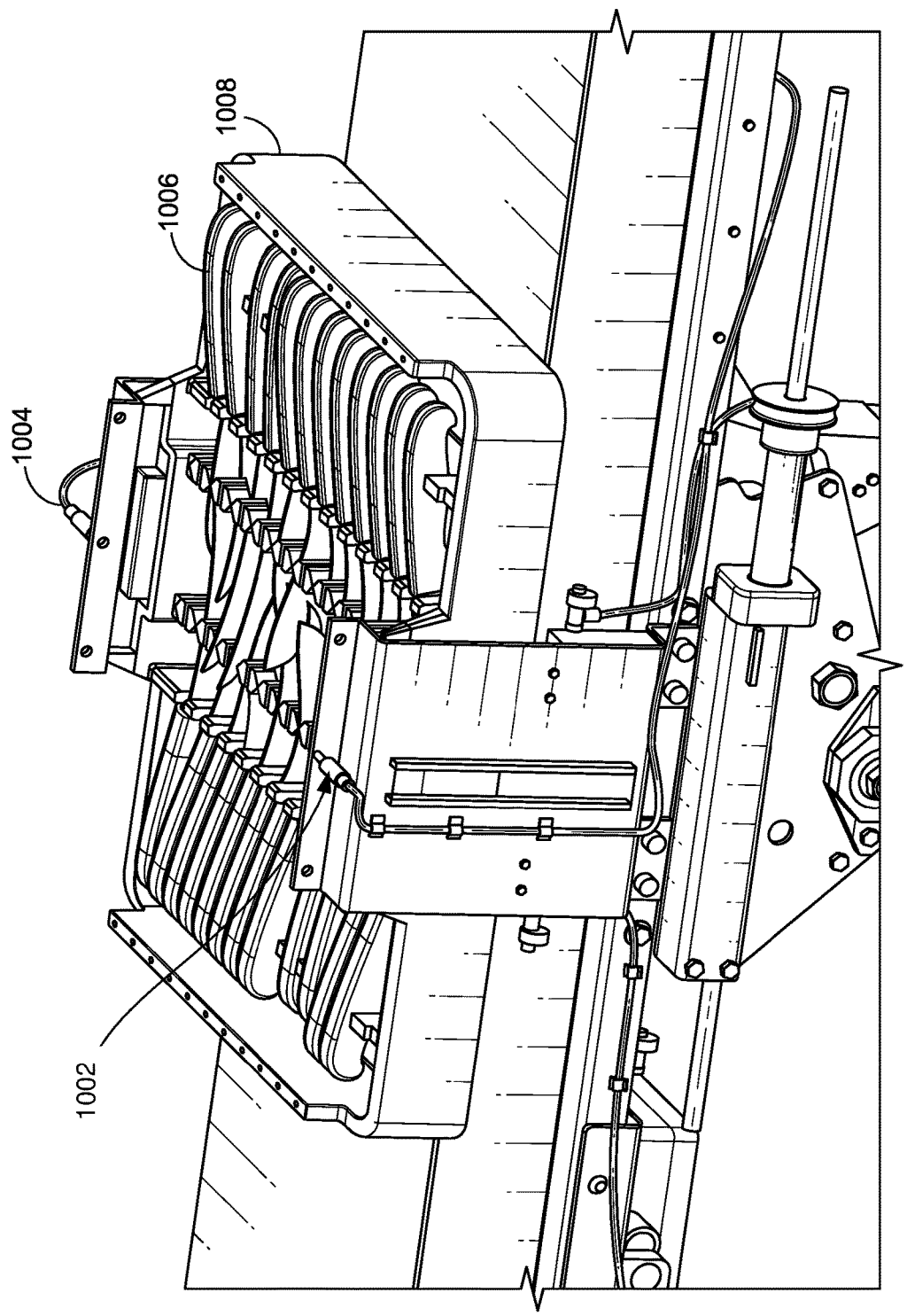
FIG. 10 depicts an illustrative schematic diagram for a knife tray, in accordance with one or more example embodiments of the present disclosure.

FIG. 10 depicts an illustrative schematic diagram for a knife tray, in accordance with one or more example embodiments of the present disclosure.

Referring to FIG. 10, there is shown a tray 1008 holding a plurality of knives 1006, where a pair of knife length through-beam sensors are situated (e.g., knife length through-beam sensors 1002 and 1004).

In one or more embodiments, when a knife is lifted vertically out of the tray by the robot. A thru-beam sensor may be located to capture the rough length and shape of the blade. Because the blade may pass through the thru-beam sensor, the height of the blade may be calculated and the rough position of the bottom edge of the blade may be determined. Knowing this information, a scanning algorithm may determine one of two locations to hold the knife in the scanning position.

In one or more embodiments, the queuing system may be installed above the ends of the conveyor. The queuing system may allow a user to queue up a number of trays of knives to be sharpened. A corresponding queuing system may be located on the exit of the conveyor to allow for the trays to stack up once it is finished. The entrance and exit queueing systems may be a vertical conveyor which may move the trays up and down in an automated manner.

In one or more embodiments, the scanning process may include the robot holding the knife in a fixed location, and the scanners may be mounted to a vertical motorized rail. The scanners may move to acquire the knife profile scan. Depending on the shape of the knife, the robot may move the knife to one or more fixed locations, and the scanners may move vertically to scan the length of the blade. The scanner data is may be filtered to create a knife profile and robot path along the grinding stones.

In one or more embodiments, there may be multiple scanners mounted to face each other. The scanners may be 2-D or 3-D scanners when combined with a vertical stage, and they may determine 3-D objects with a scan. The motor on the scanner assembly may drive a vertical ball screw attached to linear rails. The assembly may move the scanners vertically in a controlled and precise manner.

In one or more embodiments, the user interface on the machine may include a touch screen monitor on the door of the electrical enclosure. The touch screen monitor may display the start and stop buttons for operators to interact with the machine.

Figure 11:
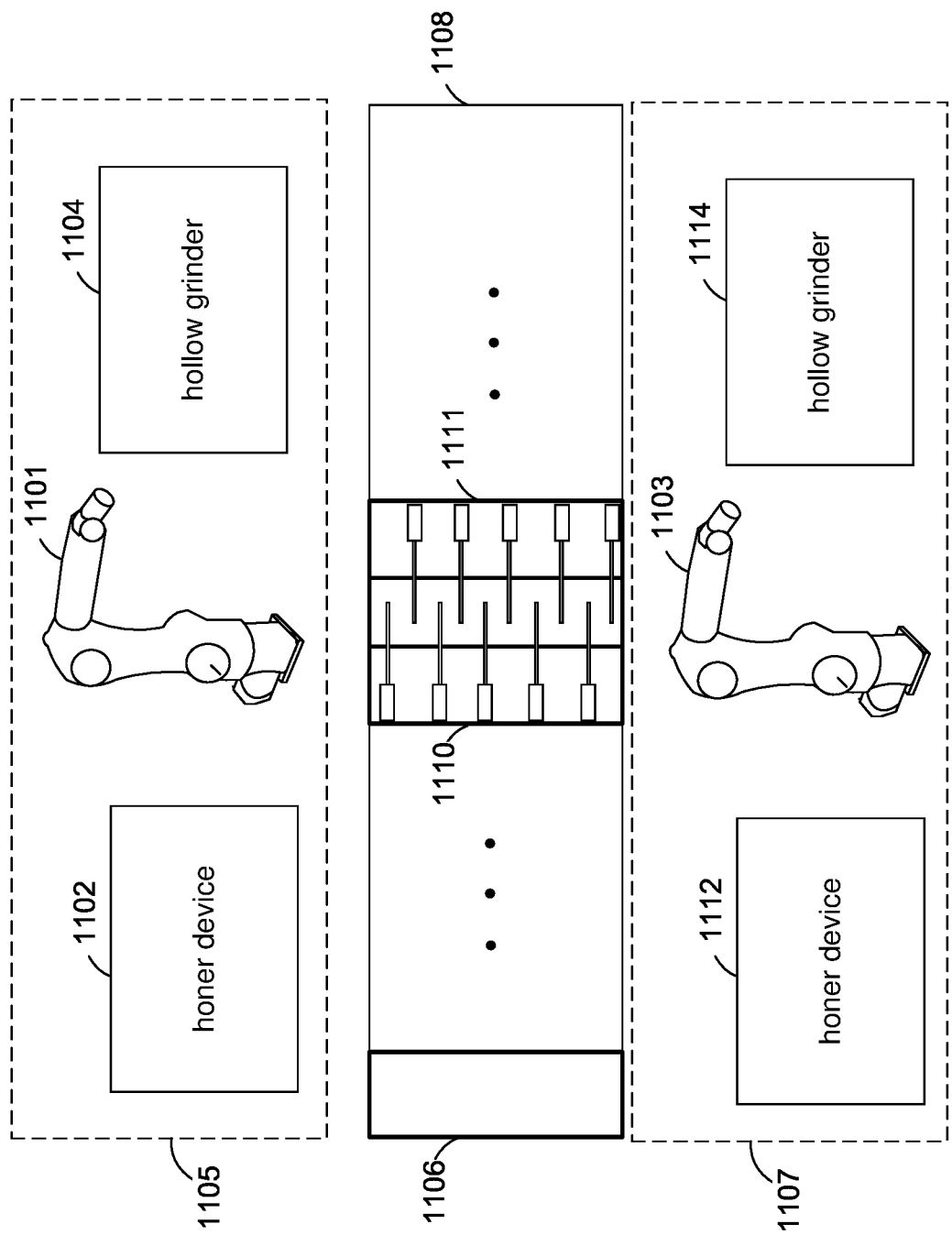
FIG. 11 depicts an illustrative schematic diagram for a cutting tool sharpening system, in accordance with one or more example embodiments of the present disclosure.

FIG. 11 depicts an illustrative schematic diagram for a cutting tool sharpening system, in accordance with one or more example embodiments of the present disclosure.

Referring to FIG. 11, there is shown two modules 1105 and 1107 operating on a common conveyor belt 1108 where a tray comprised of a first tray 1110 (TRAY 1) and a second tray 1111 (TRAY 2) may carry one more knives that are placed in the tray in order to be sharpened. For example, module 1105 may comprise at least in part a honer device 1102, a hollow grinder 1104, and a robot arm 1101. It should be understood that whenever the robot arm 1101 picks up a cutting tool from the first tray 1110, it must rotate in order to face the scanner 1106. On the other hand, if the robot arm 1101 picks up a cutting tool from the second tray 1111, by default, the cutting tool is facing scanner 1106 meaning the robot arm 1101 does not need to rotate in order to face scanner 1106. Similarly, module 1107 may comprise similar components. For example, module 1107 may comprise a robot arm 1103, a honer device 1112, and a hollow grinder 1114. It should be understood that although a honer device and a hollow grinder device are shown in each module, other devices may also be included in each module to be used for sharpening a knife.

Figure 12:
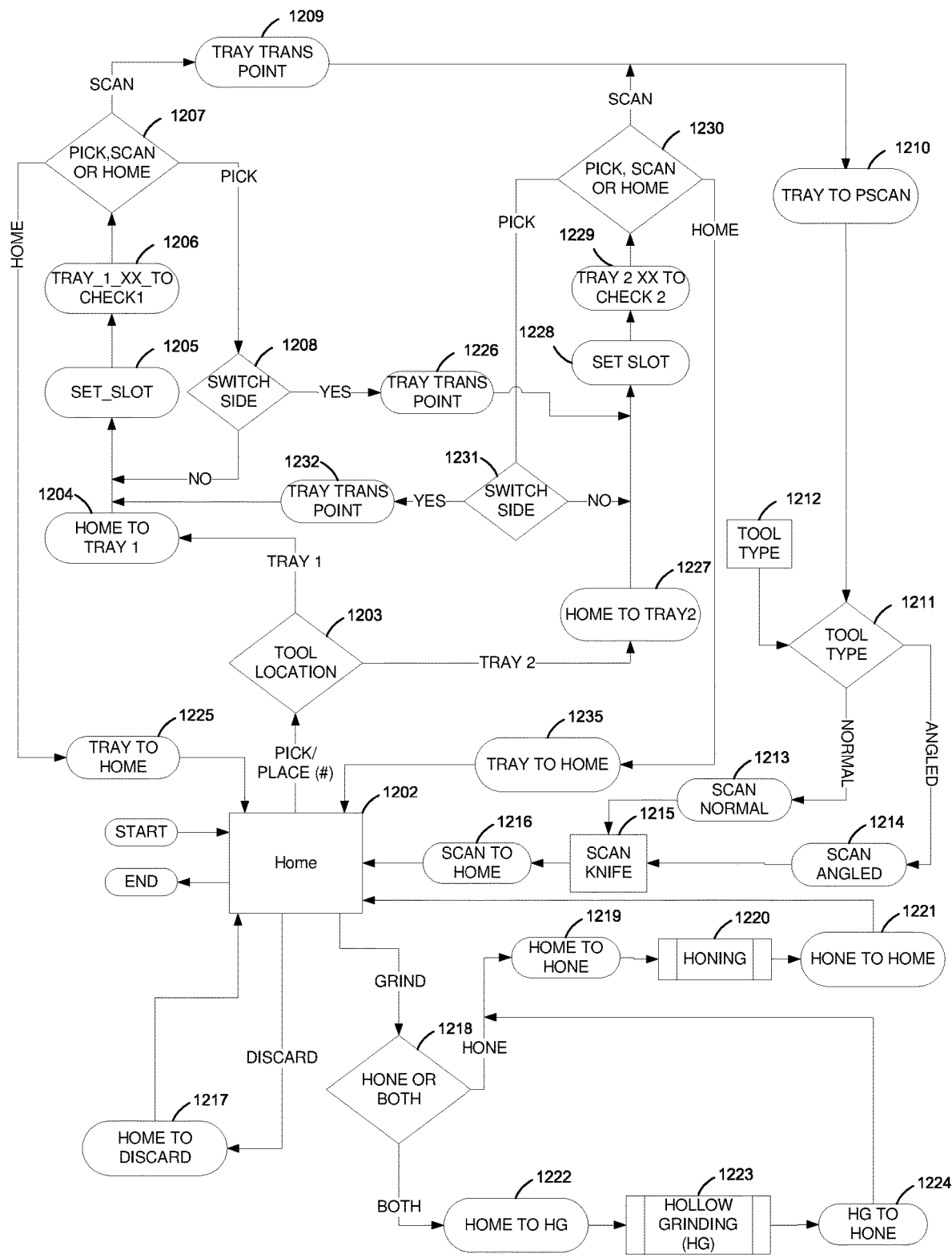
FIG. 12 depicts an illustrative process flow for an algorithm for controlling robot movements for sharpening cutting tools, in accordance with one or more example embodiments of the present disclosure.

FIG. 12 depicts an illustrative process flow for an algorithm for controlling robot movements for sharpening cutting tools, in accordance with one or more example embodiments of the present disclosure.

The process starts with a controller advancing a robot arm to a home location at block 1202, which indicates the home position of the robot arm. The controller device may determine to move the robot arm in order to determine whether to pick or place a cutting tool.

At block 1203, if the controller determines that the robot arm should pick or place a cutting tool, the controller first determines a cutting tool location relative to a first tray section (TRAY 1) and a second tray section (TRAY 2) of a tray. In case the cutting tool location is determined to be in TRAY 1, the controller causes the robot arm to move from home location to a position relative TRAY 1 at block 1204.

At block 1205, the controller receives data received from one or more sensors as to the exact location of the cutting tool on the TRAY 1. The controller determines the slot where the cutting tool is located and moves to a location above the cutting tool location in TRAY 1.

At block 1206, the controller moves to pick up the cutting tool at slot position XX (XX represents the slot number where the cutting tool is placed in TRAY 1). At this block, the controller may collect information related to the cutting tool in order to make a decision on how to proceed.

At block 1207, the controller may determine whether to pick another cutting tool, in the case of a failed pick, scan the current cutting tool, or send the cutting tool back to the home location. In case the cutting tool needs to be discarded, for example, the controller may send the robot arm after it grabs the cutting tool to the home location at block 1202, after which the robot arm will be commanded to perform the DISCARD routine at block 1217.

At block 1208, if the controller determines to pick up a different cutting tool, the controller has to determine whether to switch the orientation of the robot arm to be facing the scanning device before picking up the cutting tool. In case the robot arm does not need to be rotated to face the scanner device, the controller proceeds to block 1205 to pick up the cutting tool.

At block 1209, if the controller determines that a scan is needed (at block 1207), the controller may perform a tray to a transition point after grabbing the cutting tool. A transition point is a point above the center of the tray, which gives the robot arm room to rotate in a specific direction. At this transition point, the controller determines whether the robot arm should be rotated to face the scanner or should stay in the same orientation that faces the scanner. This is based on the tray portion (either TRAY 1 or TRAY 2) because, for example, TRAY 1 houses a cutting tool in the opposite direction of where a cutting tool would be housed in TRAY 2.

At block 1210, the controller moves the robot arm after grabbing the cutting tool to place it in front of a scanner to perform a scanning process.

At block 1211, the controller determines a type of cutting tool (e.g., a knife type) based on information or data received from block 1212 associated with the cutting tool. The controller determines at block 1211 whether the cutting tool is a "normal type" (meaning it is straight) at block 1213 or an "angled type" (meaning it is angled or curved) at block 1214. Based on the type of cutting tool, the robot arm may be moved to a specific orientation in order to result in a full scan of the cutting tool. It should be appreciated that a cutting tool being straight or angled may require a different orientation while being fully scanned to collect 3D data.

At block 1215, after the controller determines that the tool type is a normal type or an angled type, the controller may perform a 3D scan associated with that type of cutting tool.

At block 1216, the controller may determine to move the robot arm to the home position after collecting the 3D data from the 3D scan at block 1215. At that time, the controller may determine whether to discard the cutting tool or to grind the cutting tool.

At block 1217, if the controller determines that the cutting tool should be discarded based on the collected 3D data, the controller proceeds to move the robot arm from the home location to a discard location, where discarded cutting tools are placed.

At block 1218, if the controller determines to grind the cutting tool based on the collected 3D data, the controller performs a determination whether both a honing process and a hollow grinding process are needed or whether only a honing process is needed.

At block 1219, in case the controller determines that only honing is needed for the cutting tool, the controller moves the robot arm from the home position to a hone position to situate the cutting tool in a position for honing using the honing device.

At block 1220, the controller, using the robot arm, may proceed to perform honing on the cutting tool using the honing device.

At block 1221, the controller may move the robot arm gripping the cutting tool from the hone location to the home location.

At block 1222, if the controller determines that both honing and hollow grinding are needed (based on the 3D data collected at block 1215, the controller may move the robot arm from the home position to a hollow grinding position in front of the hollow grinding device.

At block 1223, the controller may proceed to perform hollow grinding on the cutting tool using the hollow grinding device.

At block 1224, the controller may move the robot arm gripping the cutting tool from the hollow grinding location to the honing location in order to perform the honing process on the cutting tool.

At block 1225, if the controller determines to send the cutting tool home (at block 1207), the controller may move the robot arm gripping the cutting tool from the tray location to the home location.

Going back to block 1208, if the controller determines that the robot arm needs to be rotated to face the scanner device, the controller may proceed to the transition point at block 1226.

Referring back to block 1203, if the controller determines that the cutting tool is located on TRAY 2, the controller may perform at block 1227 a transition from the home location to TRAY 2.

At block 1228, the controller receives data received from one or more sensors as to the exact location of the cutting tool on the TRAY 2. The controller determines the slot where the cutting tool is located and moves to a location above the cutting tool location in TRAY 2.

At block 1229, the controller moves to pick up the cutting tool at slot position XX (XX represents the slot number where the cutting tool is placed in TRAY 2). At this block, the controller may collect information related to the cutting tool in order to make a decision on how to proceed.

At block 1230, the controller may determine whether to pick the cutting tool, scan the cutting tool, or send the cutting tool back to the home location. In case the cutting tool needs to be discarded, for example, the controller may send the robot arm home (block 1235) after it grabs the cutting tool to the home location at block 1202.

At block 1231, if the controller determines to pick up the cutting tool, the controller has to determine whether to switch the orientation of the robot arm to be facing the scanning device before picking up the cutting tool. In case the robot arm does not need to be rotated to face the scanner device, the controller proceeds to block 1228 to pick up the cutting tool.

At block 1232, if the controller determines to pick up the cutting tool but also determines that it needs to switch the orientation of the robot arm to be facing the scanning device, the controller proceeds to the transition point on the tray to pick up the cutting tool at block 1205 to determine the exact location of the cutting tool.

Figure 13:
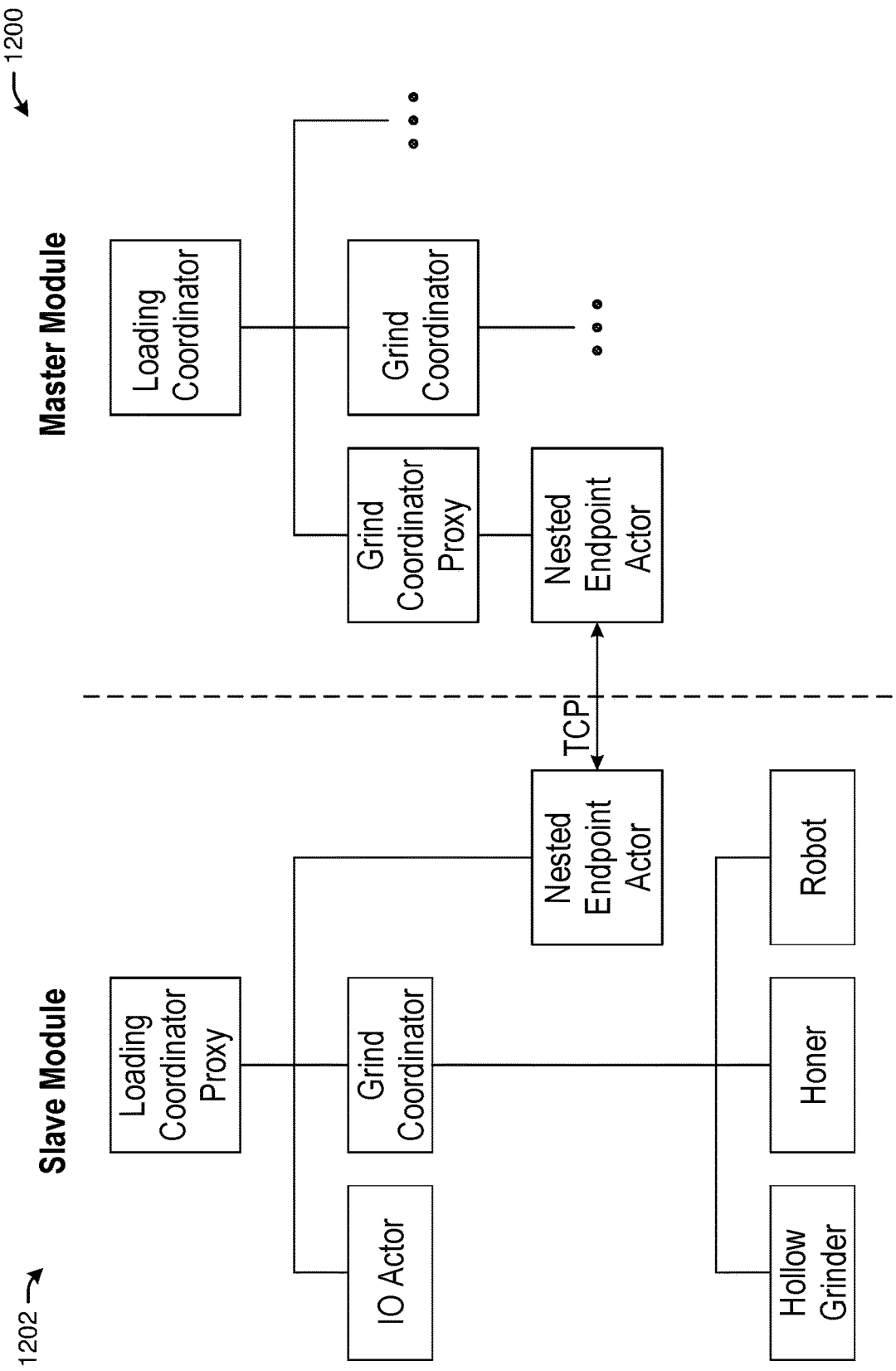
FIG. 13 depicts an illustrative schematic diagram for a system with a primary module and a secondary module, in accordance with one or more example embodiments of the present disclosure.

FIG. 13 depicts an illustrative schematic diagram for a system with a primary module and a secondary module, in accordance with one or more example embodiments of the present disclosure.

In one or more embodiments, there may be two robots in the system when the system is configured with a primary and secondary module. The two robots share space and subsystems and therefore are at risk of colliding. They share the tray and scanner as a resource and therefore cannot use them at the same time. The secondary side is equipped with its own pc and is able to communicate over Ethernet to the primary side. The algorithm for collision prevention is written such that both robots know what stage the other robot is in. If the other robot is in a place that is deemed to be a shared space the robot will not move to that space. It will wait until the robot has finished its task and has moved on.

In one or more embodiments, when a system is configured with a primary module (master module 1200) and a secondary module (slave module 1202), the two modules may communicate through wired or wireless communication. In one example the communication may be a TCP Ethernet connection. Another example the communication may be Bluetooth, Wi-Fi, NFC, or any other wireless communication. Each module may comprise a loading coordinator, an input-output actor, a grind coordinator, a hollow grinder, a homeowner, a robot, and a nested endpoint actor. It should be understood that although these devices may be included in each of the modules, other devices may also be envisioned.

In one or more embodiments, the robot may be a high-precision piece of equipment that may move from point to point with repeatability and accuracy. The robot may be calibrated to any of the pieces of hardware to which the robot interfaces. The calibration may allow for the primary and secondary systems to uniquely be configured to allow for many assembly variations.

In one or more embodiments, the process for calibrating the robot to the scanner may include both a left and a right scanner to scan a fiducial machined into the gripper. There may be an identical fiducial on both the left and right sides of the gripper. The fiducial may be a triangle with two chamfered faces, for example. When the robot scans for the fiducial, the calibration algorithm finds the planes on the fiducial. The robot may be able to find a single point in robot space where three planes intersect. The single point in space may be used as a known position from the end of the robot and may be used to correlate to the scanner.

Figure 14:
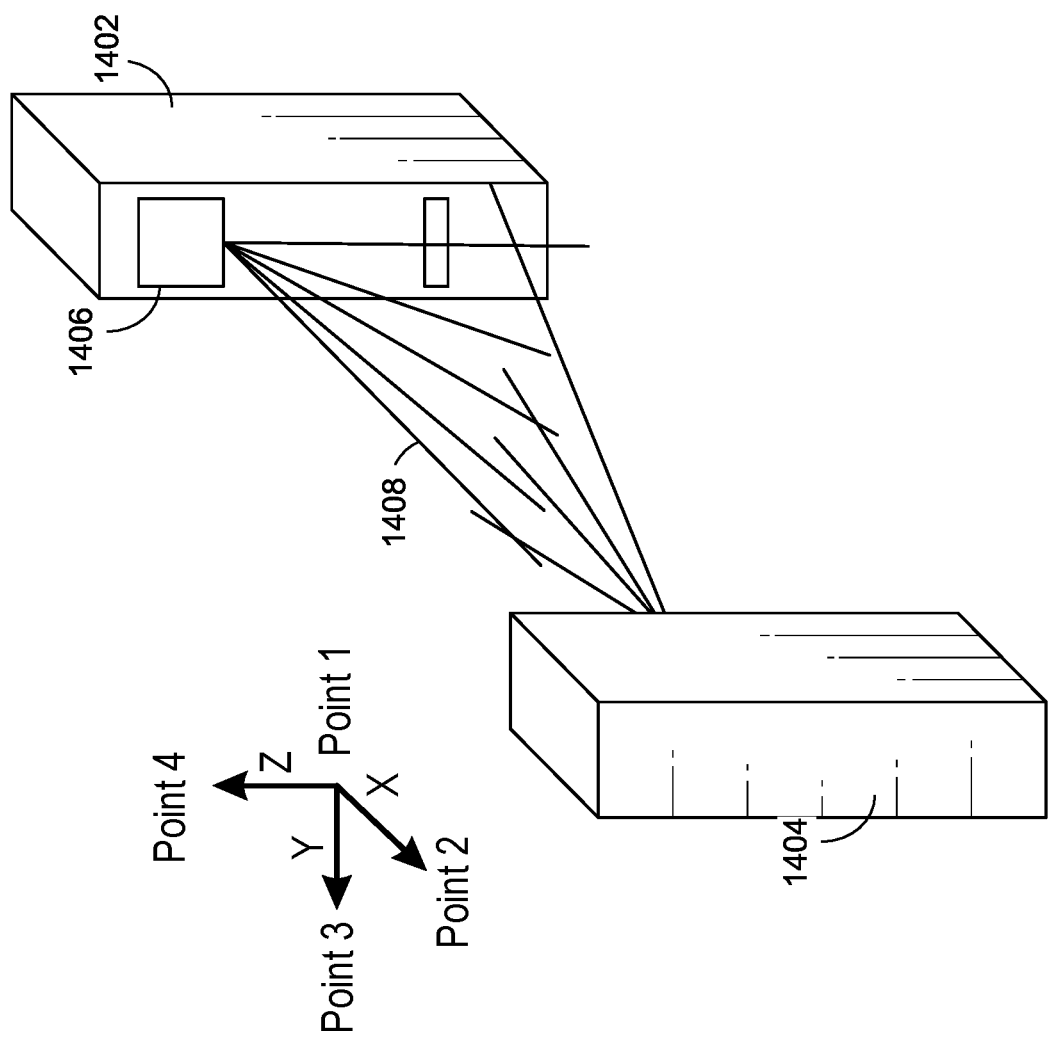
FIG. 14 depicts an illustrative schematic diagram for correlating a scanner to a robot, in accordance with one or more example embodiments of the present disclosure.

FIG. 14 depicts an illustrative schematic diagram for correlating a scanner to a robot, in accordance with one or more example embodiments of the present disclosure.

Referring to FIG. 14, there is shown a pair of scanners 1402 and 1404 that may scan one or more fiducials situated on the robot arm using scanning beams 1408.

In one or more embodiments, the process of correlating the scanner to the robot may be performed by finding four points in robot space and correlating the points to a scanner space for any scanner. The left scanner may scan the left fiducial, and the right scanner may scan the right fiducial. To calibrate the scanners, the robot may move the robot to an arbitrary point in robot space that is pre-set to be a known point within the scanning array. The scanner may scan vertically, may collect the data, and may find a point 1 for both the right and left scanner. The robot may move a known linear move in the X-direction, and the scanner may scan vertically to find point 2. The robot may return to point 1, may move a known linear distance to point 3, and a scan may be performed. The robot may return to point 1, may move a known linear distance to point 4, and a scan may be performed. Given these four known points in robot space and in scanner space, both the left and right scanners may be correlated to the robot. As a final confirmation, the robot may move to a final known point in robot space, and the scanner may perform a final scan and may compare the two points in robot space to the scanner space to validate that the calibration is complete.

In one or more embodiments, the method for calibrating the robot to the knife tray may use a multi-point calibration technique. The tray may be positioned in the locked home position fully loaded with knives. A robot programming technician may start the calibration routine and manually move the robot to align the gripper to the pick-up location of the first knife in the tray. The first knife alignment may be referred to as Calibration Point 1. The Calibration Point 1 may be recorded, and the robot technician manually may move the robot to a Calibration Point 2, record the Calibration Point 2, may move the robot to a Calibration Point 3, and may record the Calibration Point 3. With the three known points, the XY locations of the tray may be determined, and the full array of points for any knives may be determined. The tray may be calibrated to the robot.

In one or more embodiments, the method for calibrating the robot to the grinding stones may use a two-point calibration technique. The robot may pick up a knife from the tray and scan the knife to determine where the tip of the knife is located. The robot manually may be moved by a robot technician to the grinding stones, and the tip of the knife may be positioned at the front of the stones where the stones interlace and overlap. This position may be Calibration Point 1 and may be recorded. The robot technician manually may move the robot to align the tip of the knife at the back of the stones where the stones interlace and overlap. This position may be Calibration Point 2 and may be recorded. Using these two points in robot space, a linear line is fit and the grinding path may be calibrated.

In one or more embodiments, the vision algorithm may be used to determine which knives are currently in each tray. The vision algorithm may not guarantee that a user will place a knife into each slot of the tray, and the machine may determine which slots include a knife to be sharpened. The algorithm used to find which slots are populated in the tray may include an image comparison algorithm. The machine may verify that a tray is located in the locked home position, and may capture an image from above. The image may be processed to find multiple features. For example, analyzing the image may result in the left edge, the right edge, and the fiducial circle at the center of the tray being located using a vision filtering algorithm. These features may allow the tray to be centered and oriented and compared to a golden image. The golden image may be a picture of the tray without any knives inside of it. The algorithm may compare the image captured of the tray to the golden image and may determine which knives are populated in the tray. The algorithm may record which knives are populated so that the robots may determine which slots (e.g., locations) to move to in the tray to find a knife.

Figure 15:
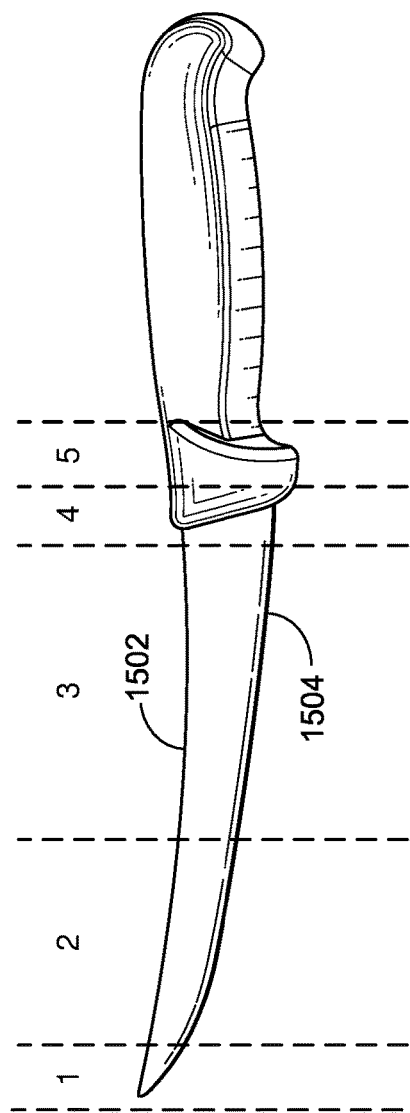
FIG. 15 depicts a schematic diagram for an illustrative cutting tool (e.g., a knife), in accordance with one or more example embodiments of the present disclosure.

In one or more embodiments, the scanning algorithm may be one of the multiple technologies in the machine with the ability to grind consistently and accurately. The ability may be dependent on getting an accurate representation of the knife blade. A knife may be unique and unknown when entering the machine. There are different styles, shapes, and types of knives, and the machine may determine any details of the knife before starting the grind. The software may divide the knife into multiple sections. As shown in FIG. 15, section 1 may include the tip of the knife; section 2 may include the curved portion of the knife; section 3 may include the flat portion of the bottom edge of the knife; section 4 may include the heel of the knife, and section 5 may include the handle of the knife. The scanning algorithm may be designed to determine the features within any knife in these areas.

FIG. 15 depicts a schematic diagram for an illustrative cutting tool (e.g., a knife), in accordance with one or more example embodiments of the present disclosure.

Referring to FIG. 15 there is shown five sections of a knife 1500. The knife 1500 may have a top edge 1502 and a bottom edge 1504.

In one or more embodiments, the first step in scanning the knife may be to identify the top edge and bottom edge of the knife. The scan data may be processed and filtered to look for the top edge and bottom edge of the knife using both scanners. Using the data, a polynomial curve fit may be applied to create a quantifiable line for both the top and bottom edge of the knife. The two curves may be filtered to remove any extraneous data points and smoothed to create two continuous polynomial curves. These two polynomial curves may be referred to as the top and bottom edge and may be used to find the remaining features on the knife.

In one or more embodiments, using the polynomial curves from both the top and bottom edge of the knives, the curves may be compared, the intersection of two lines may be identified. The point where the two lines intersect may be determined to be the tip of the knife. The tip of the knife may be a globally known position to be used in the robot's global reference space. Some knives may have their tips removed for safety reasons. For those types of tips, the controller may determine the smallest distance between the top edge and the bottom edge. At that point, it may be determined that it is now the tip of the knife.

In one or more embodiments, because there may be multiple types of knives, the software may determine how the blade intersects the handle. There may be multiple different types of knives to be evaluated. Knives, where the blade drops below the handle, may be considered chef knives. All other knives, the blade may intersect with the handle.

In one or more embodiments, the bottom edge polynomial curve data may be evaluated in the region of the handle, and based on the shape of the curve within section 5 of the bottom edge curve, it may be determined whether the blade is a chef knife or all other knives. If the knife is a chef knife, the code may skip heel detection and move onto hollow grind detection, but if the blade may be considered to one of the other knives, the algorithm may evaluate the heel of the knife.

Figure 16:
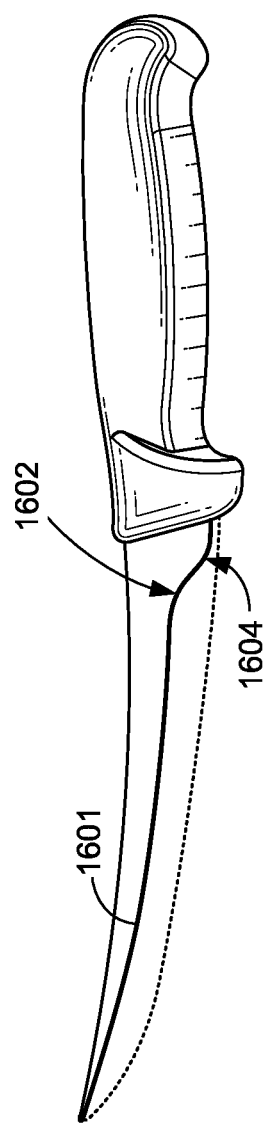
FIG. 16 depicts an illustrative schematic diagram for a knife having an S-curve, in accordance with one or more example embodiments of the present disclosure.

FIG. 16 depicts an illustrative schematic diagram for a knife 1600 having an S-curve, in accordance with one or more example embodiments of the present disclosure.

In one or more embodiments, the heel detection algorithm may determine the way to ground the heel of the knife. A brand new knife may intersect the handle almost seamlessly. A knife that has been ground many times may develop an S-Curve at the heel of the knife.

FIG. 16 shows a line 1601 to represent the bottom edge of a knife that has been ground many times. The S-Curve 1604 may include its own unique polynomial curve fit applied to it. The algorithm may evaluate the bottom edge polynomial curve within section 4 of the blade (see FIG. 15) and may identify the inflection point 1602 by looking for reverse curvature. The reverse curvature may be the point that the blade starts into the S-Curve feature that is shown in FIG. 16. The inflection point 1602 may be the start of what may be called the heel of the knife. This section of the knife may have its own unique algorithm within the force feedback grinding algorithm. In one or more embodiments, one of the steps of sharpening a knife may include a hollow grinding of the knife. A knife may not have to be hollow ground every time it is sharpened. One process may include passing the edge of the knife through a gauge block. If the knife fits within the U-shaped channel in the gauge block without any interference, the knife may "pass" and may not need hollow grinding. If the knife is too wide to pass freely within the u-shaped channel in the gauge block, the test may fail, and the knife may need hollow grinding.

Figure 17:
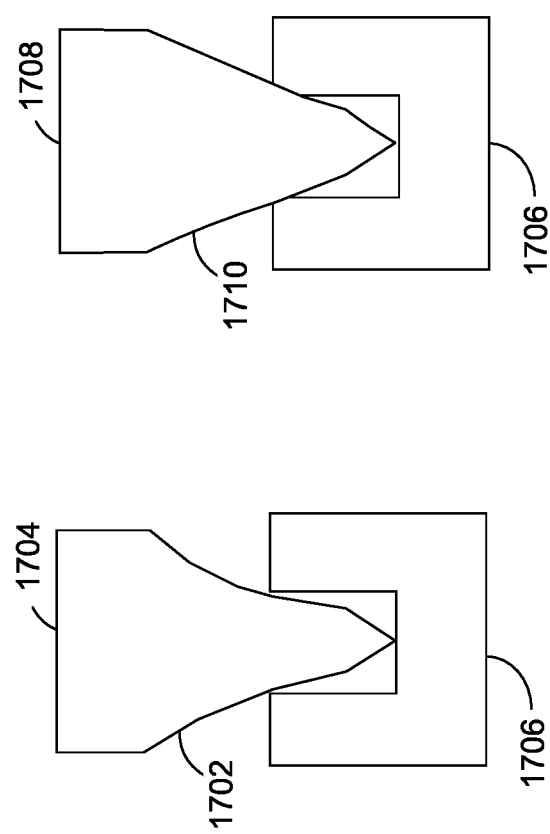
FIG. 17 depicts an illustrative schematic diagram for hollow grinding testing, in accordance with one or more example embodiments of the present disclosure.

FIG. 17 depicts an illustrative schematic diagram for hollow grinding testing, in accordance with one or more example embodiments of the present disclosure.

Referring to FIG. 17, there is shown a cross-sectional of a cutting tool being tested for whether hollow grinding is necessary or not. A first cutting tool 1704, may have a knife section view 1702 and a second cutting tool 1708 may have a knife section view 1710. The first cutting tool 1704 and the second cutting tool 1708 may be tested using a gauge block 1706. As shown in FIG. 17, the cutting tool 1704 would not need hollow grinding because the knife section view 1702 fits within the gauge block 1706, while the cutting tool 1708 does require hollow grinding because the knife section view 1710 does not fit within the gauge block 1706. It should be understood that this hollow grinding testing is performed automatically by an algorithm run by the controller. It is understood that the above descriptions are for purposes of illustration and are not meant to be limiting.

Figure 18:
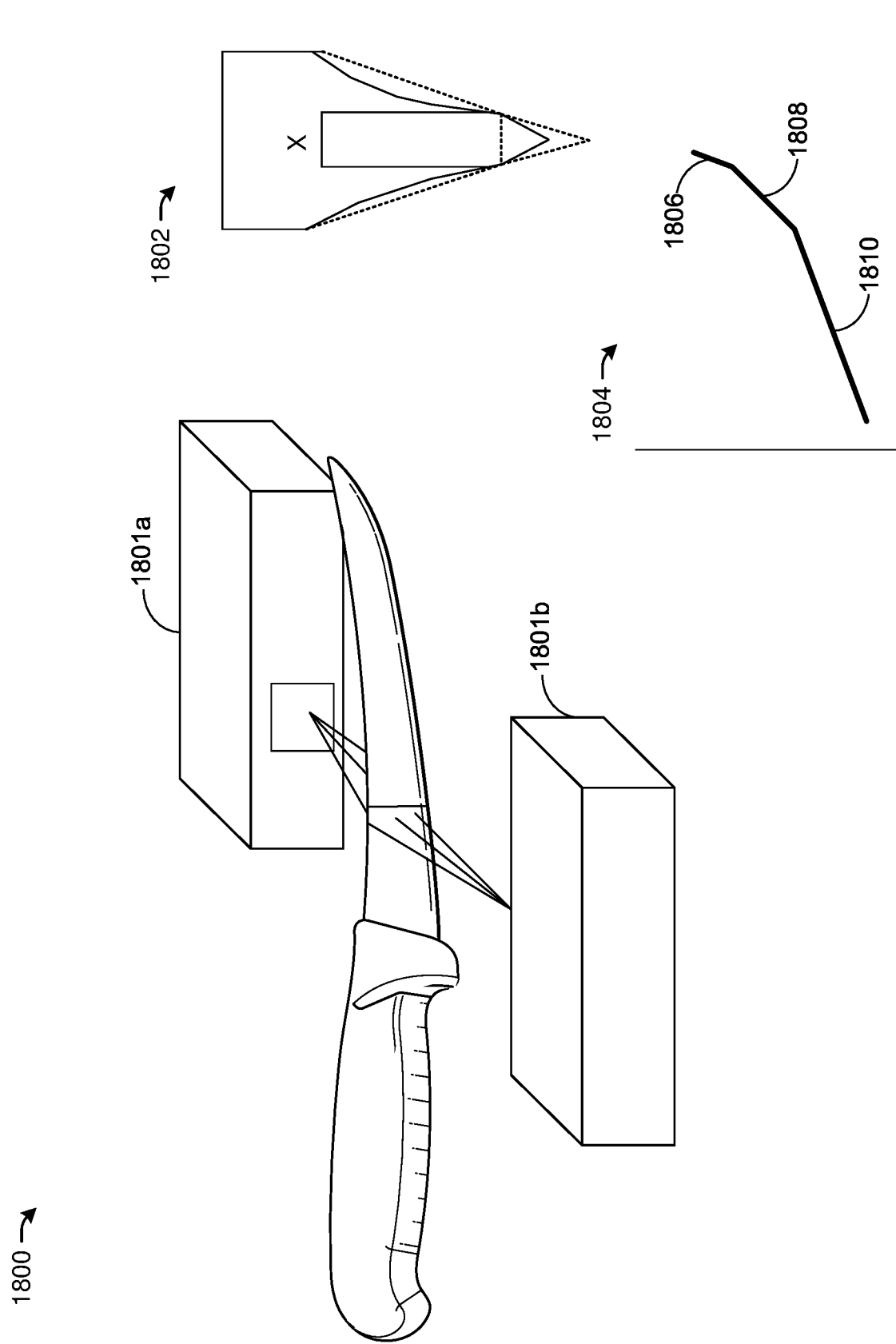
FIG. 18 depicts an illustrative schematic diagram for identifying one or more edges of a cutting tool, in accordance with one or more example embodiments of the present disclosure.

FIG. 18 depicts an illustrative schematic diagram for identifying one or more edges of a cutting tool 1800, in accordance with one or more example embodiments of the present disclosure.

In one or more embodiments, the scanning algorithm may automate this test using the scan data collected (see FIG. 12). This automation is performed automatically by the controller, as shown in FIG. 12, and does not require a user determination whether to hollow grind or not. The scan data may be performed by a cutting tool being placed between a pair of scanners 1801a and 1801b, which may create a 2-dimensional curve at any scan interval along the face of the knife for both sides of the knife. Using the scan data, a curve fit 1804 may be applied to find the edges for both sides of the knife. A sharpened edge 1806 is the shortest line closest to the tip of the knife. The hollow grind edge 1808 is the line between the sharpened edge and the flat knife edge 1810. The flat knife edge 1810 is the remaining face of the knife. The algorithm may correlate the two sides of the knife and may measure the distance known as X, on the cross-sectional 1802 of the knife, at the point where the sharpened edge and hollow grind edge intersect. This measurement is made at each 3D position along the middle ⅓ of the knife profile, and the results are averaged in order to provide a final thickness dimension. If this dimension is greater than a predetermined amount the knife may be hollow ground. The variable X may be configured by a user to adjust the threshold when a knife may go through or otherwise need a hollow grind. In an enhanced method, an operator may adjust the threshold at which a knife is hollow ground and has nearly infinite adjustability. Additionally, an operator may adjust the threshold to intelligently determine the number of sharpening passes the knife may go through to ensure optimum material removal.

In one or more embodiments, within normal operating use of a knife, a knife may become damaged. Damaged knives may be difficult to use, but also may be hazardous to a user. There are different ways for knives to become damaged, but some of the common defects that are found in knives include chips, breaks, bends, and potentially cracks.

In one or more embodiments, the scanning algorithm is able to determine the defects when a polynomial curve fit fails to align to the top or bottom edge of the knife blade. A chipped knife will show up as an error when the bottom edge is being calculated with the polynomial curve fit. The curve will have too many outlier points. The algorithm will have a threshold that can be set to allow for a certain amount of deviated points to be discarded. If there are too many deviated points that need to be discarded the knife will be categorized as chipped. A knife may also be categorized as chipped if the polynomial curve fit is not able to be smoothed through filtering.

In one or more embodiments, the scanning algorithm is able to determine the defect of a bent knife because there are two scanners. The data from the scanners can be analyzed from a top-down flattened view and the curve can be compared to a straight line to determine whether the blade is straight or bent.

In one or more embodiments, a broken knife can be determined when the algorithm tries to find the tip of the knife by evaluating when the top edge polynomial curve and bottom edge polynomial curve converge. If the two curves don't converge to a point as expected the knife can be determined to have a broken tip.

In one or more embodiments, the end of life of a knife or a knife that is too small can be determined by evaluating the distance between the top and bottom edge of the knife. A predetermined threshold number can be applied to set the overall height for when a knife is too small. If the distance between the top and bottom edge reaches the threshold the knife will be determined to be too small or have reached the end of life.

In one or more embodiments, because the algorithm may identify the top edge, bottom edge, and size of the knife, the algorithm may compare the data against known knife types and recognize different types of knives. The honing angle may be adjusted automatically or by a user to pick optimal angles for different knife types. The grinding algorithm takes the information gathered from scanning and calibrations to pass the knife along the grinding stones to sharpen the knife. The grinding algorithm for hollow grinding and honing is very similar and for most purposes is considered the same. Some small differences may be addressed in the code.

Figure 19:
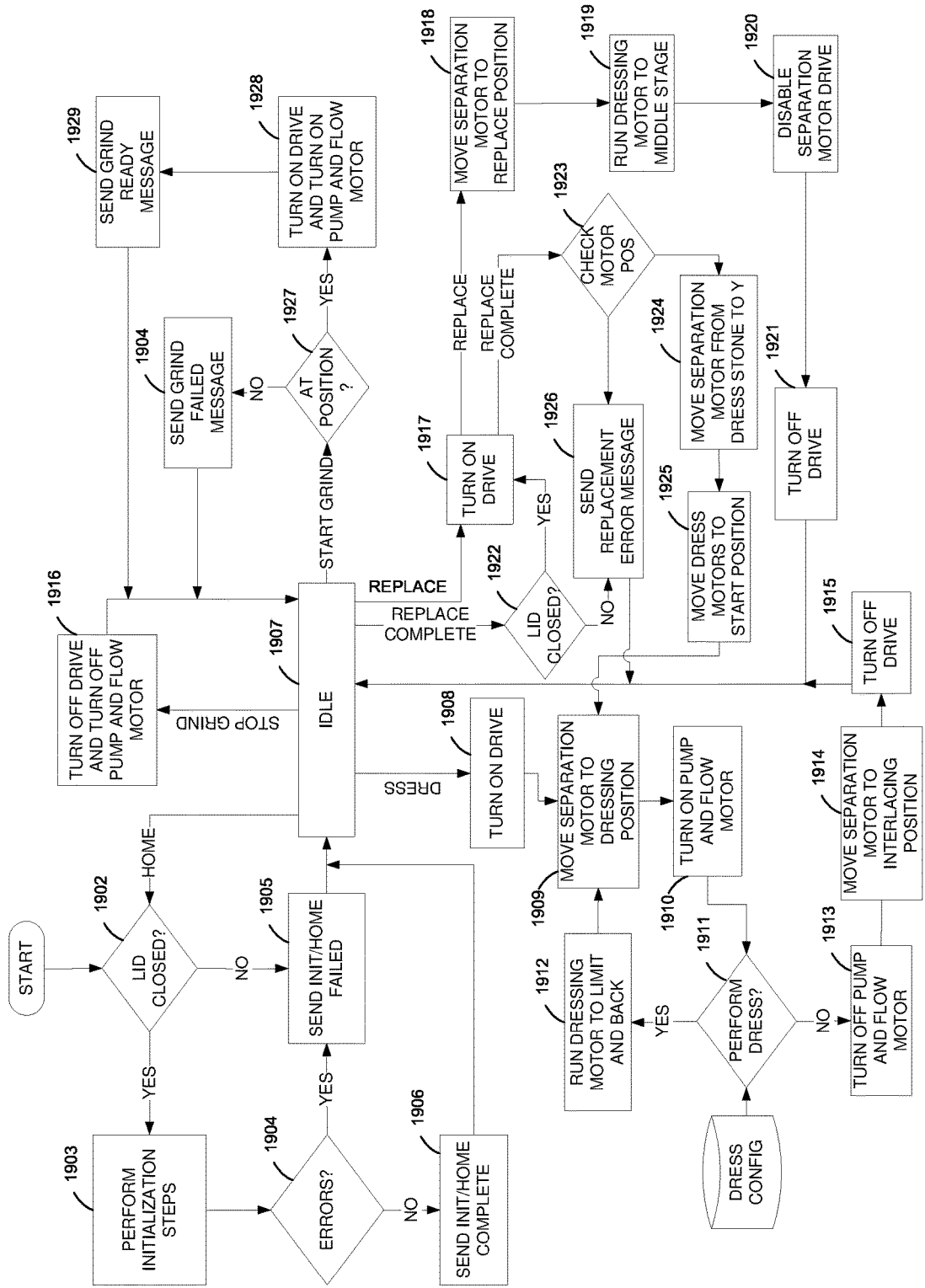
FIG. 19 depicts an illustrative flow for a cutting tool grinding, in accordance with one or more example embodiments of the present disclosure.

FIG. 19 depicts an illustrative flow for a cutting tool grinding, in accordance with one or more example embodiments of the present disclosure.

At the beginning of the grinding process, a controller may determine whether the lid of the grinder is open or closed (block 1902).

If the lid is open, the controller may perform one or more initialization steps at block 1903. These one or more initialization steps may comprise determining to turn on the drive motor, the home separation motor, moving the separation motor to an interlock position, then turning off the drive and performing a coolant check.

At block 1904, the controller may determine whether errors were generated during the one or more initialization steps at block 1903.

In case there are errors, at block 1904, the controller may send an error message indicating that the initialization has failed.

In case there are no errors, at block 1906, the controller may send a message indicating that initialization has successfully completed.

Both blocks 1905 and 1906 result in getting to an idle state at block 1907. At the idle state at block 1907, the controller may determine whether to dress, start grinding, stop grinding, replace of grinding stones complete, or grinding stone replacement is needed.

At block 1908, in case of dressing is needed, the drive is turned on then separation more is moved to a dressing position at block 1909, then at block 1910, the controller may turn on the water pump and flow motor, then a decision is made at block 1911 whether to perform dressing. If dressing is to be performed, then at block 1912, the controller may run a dressing motor between two points (e.g., a limit and back to the original position). If dressing is not performed, then at block 1913, the controller may turn off the pump and the flow motor, then move the separation motor to an interlacing position at block 1914, then turn off the drive at block 1915. After turning off the drive at block 1915, the controller may place the grinding process in an idle state at block 1907.

In case a decision was made to stop grinding at block 1907, at block 1916 the controller may turn off the drive and turn off the pump and flow motor, then the controller would place the grinding process and idle state at block 1907.

In case a decision at block 1907 is made to replace at least one of the grinding wheels, the controller may advance to turn off the drive at block 1917, then the controller would move the separation motor to her place position at block 1918 in order to run the dressing motor to a middle stage at block 1919, then disable the separation motor drive at 1920, and then turn off the drive at block 1921 before placing the grinding process in an idle state at block 1907.

If a decision at block 1907 is made to determine that a replacement of at least one of the grinding wheels has been completed, at block 1922 a determination is made whether the lid is open or closed. In case the lid is closed, then the grinding process advances to block 1917.

After determining that the drive is turned on at block 1917 and in case a replacement is complete, at block 1923, the grinding process may check the motor position. In case the motor position is within tolerance (e.g., the motor position is within a predetermined threshold from a predetermined position (e.g., less than the predetermined threshold)), then the grinding process may move the separation motor from a dress stone position to a Y position at block 1924. Then, the grinding process would move the dress motor to a start position at block 1925. This is followed by moving the separation motor to a dressing position at block 1909. Then, the grinding process may proceed to turn on the pump and the flow motor at block 1910. The grinding process may then check whether to perform dressing or not at block 1911. In case dressing is to be performed, then the grinding process may run the dressing motor to the limit and back at block 1912. This process repeats at block 1909 until a determination is made that no more dressing is needed at block 1911. In case it is determined at block 1911 that dressing does not need to be performed, the grinding process may proceed to turn off the pump and the flow motor at block 1913, move the separation motor to an interlacing position at block 1914, then turn off the drive at 1915, which would then place the grinding process and idle state at block 1907.

Referring back to block 1923, after determining that the drive is turned on at block 1917 and in case a replacement is complete, in case the motor position is not within tolerance (e.g., the motor position is not within a predetermined threshold from a predetermined position (e.g., greater than the predetermined threshold)), then the grinding process may send a replacement error message at block 1926, which then is followed by grinding process beam place in an idle state at block 1907.

Referring back to block 1922, if it was determined that the lid is not closed, then an error is raised and the grinding process may send the replacement error message at block 1926 which is then followed by placing the grinding process in an idle state at block 1907.

In case it was determined to start grinding at block 1907, the grinding process may determine whether the cutting tool is at a position that is predetermined for the proper grinding of the cutting tool at block 1927. If it was determined that the cutting tool is at the predetermined position, then the grant process may turn on the drive and turn on the pump and the flow motor at block 1928. Then, the grinding process may send a grind ready message at block 1929 before performing the grinding of the cutting tool. Subsequently, the grinding process is placed in an idle state at block 1907. It is understood that the above descriptions are for purposes of illustration and are not meant to be limiting.

Figure 20:
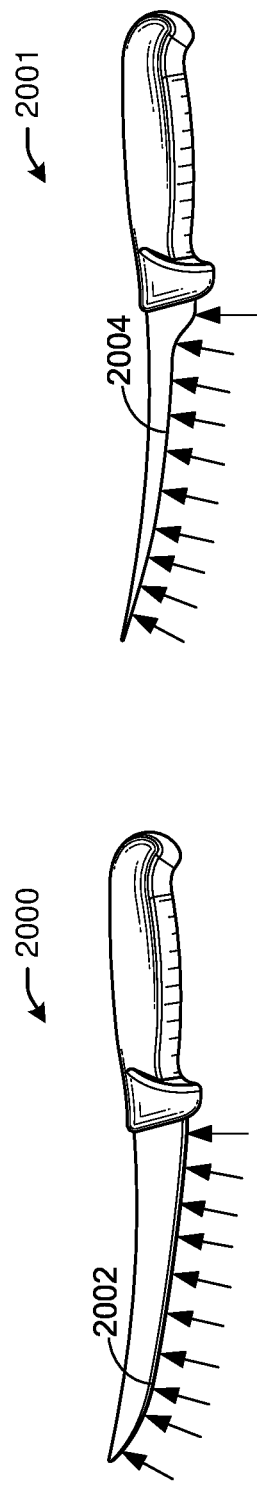
FIG. 20 depicts an illustrative schematic diagram for a pair of knives, in accordance with one or more example embodiments of the present disclosure.

FIG. 20 depicts an illustrative schematic diagram for a pair of knives, in accordance with one or more example embodiments of the present disclosure.

Referring to FIG. 20, there is shown a first knife 2000, which is a new knife and a second knife 2001, which is a knife that has been sharpened multiple times.

In one or more embodiments, the first step in grinding the knife is to take the scan data collected for the knife (e.g., new knife 2000) and to position the bottom edge 2002 of the knife onto the grinding stones. The process to grind starts with the tip of the knife and follows the path of the bottom edge 2002 of the knife maintaining perpendicularity of the knife to the grinding stones. A knife (e.g., new knife 2000) may maintain perpendicularity to the stones throughout the path of the grind. The exception to maintaining perpendicularity is on knives (e.g., knife 2001) that have been ground a number of times and there is an S-curve at the heel of the knife. Instead of maintaining perpendicularity through the S-curve at the heel, the position algorithm maintains perpendicularity to the last part of the bottom edge 2004 before the heel of the knife 2001.

In one or more embodiments, when a human sharpens a knife, different amounts of force are applied to the edge of the blade during the sharpening process. Ideally, when sharpening a knife, a constant force applied to the grinding stones would be maintained. Maintaining constant force would give a consistent and even grind. The gripper has a 3 axis force and 3 axis torque sensor to measure the forces and torques being applied to the knife while it is in the grinding process. The process to grind the knife with force feedback follows the profile of the bottom edge of the knife and maintains a constant force at every point along that edge. Since the sensor is a 3 axis force and 3 axis torque sensor the force being applied to the side of the knife due to it being offset to one side or the other can also be compensated for. The feedback of the side force is also measured and a PID loop is used to minimize the difference of the side force that is applied. Ideally, the amount of force on the side of the knife would be even. The algorithm monitors and adjusts for any side force by realigning the knife to the center of the stones.

In one or more embodiments, an additional step during force feedback is to compensate for gravity. The weight of the gripper is constantly applying a force to the force and torque sensor and that weight must be accounted for at all times during the force feedback grind. Since the orientation is constantly changing through the path of the grind, the gravity compensation algorithm takes into account the position of the gripper and compensates accordingly for gravity.

In one or more embodiments, the amount of force being applied can be adjusted. A higher force would remove more material and a lower force would remove less material. The amount of force being applied at different points of the knife can also be adjusted. For example, if it is determined that it is better to apply less force near the tip of the knife and a higher force at the heel of the knife, the algorithm can be adjusted to vary the force along the edge of the knife. The side force being applied to the side of the knife can also be set as a threshold. The overall difference in force being applied to both sides of the knife can be a threshold limit that can be set depending on the max allowable force before the algorithm will compensate and move to the center of the stones.

In one or more embodiments, each time the knife is sharpened it starts at the tip of the knife and follows the profile down to the heel of the knife. The algorithm then follows the path in reverse and follows the path back to the tip of the knife. This is considered a single pass. The number of passes taken is usually between 2-5, but it can be adjustable and changed depending on the type of knife or a user's preference. It can also be adjusted automatically based on the scanners determination of the knives wear. For example, more passes to remove more material when nicks/ships are present.

Figure 21:
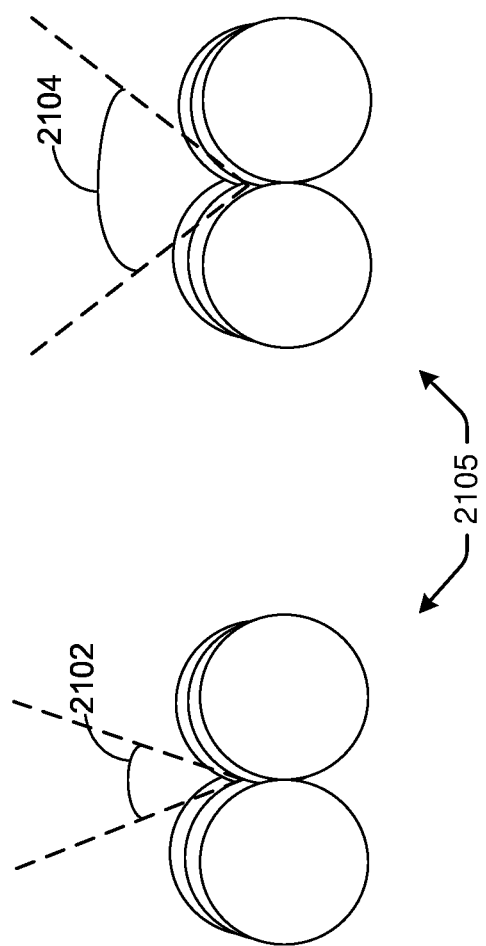
FIG. 21 depicts an illustrative schematic diagram for grinding angles, in accordance with one or more example embodiments of the present disclosure.

FIG. 21 depicts an illustrative schematic diagram for grinding angles, in accordance with one or more example embodiments of the present disclosure.

Referring to FIG. 21, there is shown two separation angles of grinding stones 2105 (e.g., angle 2102 and angle 2104). In one or more embodiments, since the two grinding stones 2105 are adjustable, the angle of grinding for honing can be adjusted. By moving the stones closer together the included angle is decreased. By moving the stones further apart the included angle is increased. The separation angles of the grinding stones 2105 may be automatically adjusted by the Comptroller of the sharpening system based at least in part on the 3D data collected during the scanning process of FIG. 12.

Figure 22:
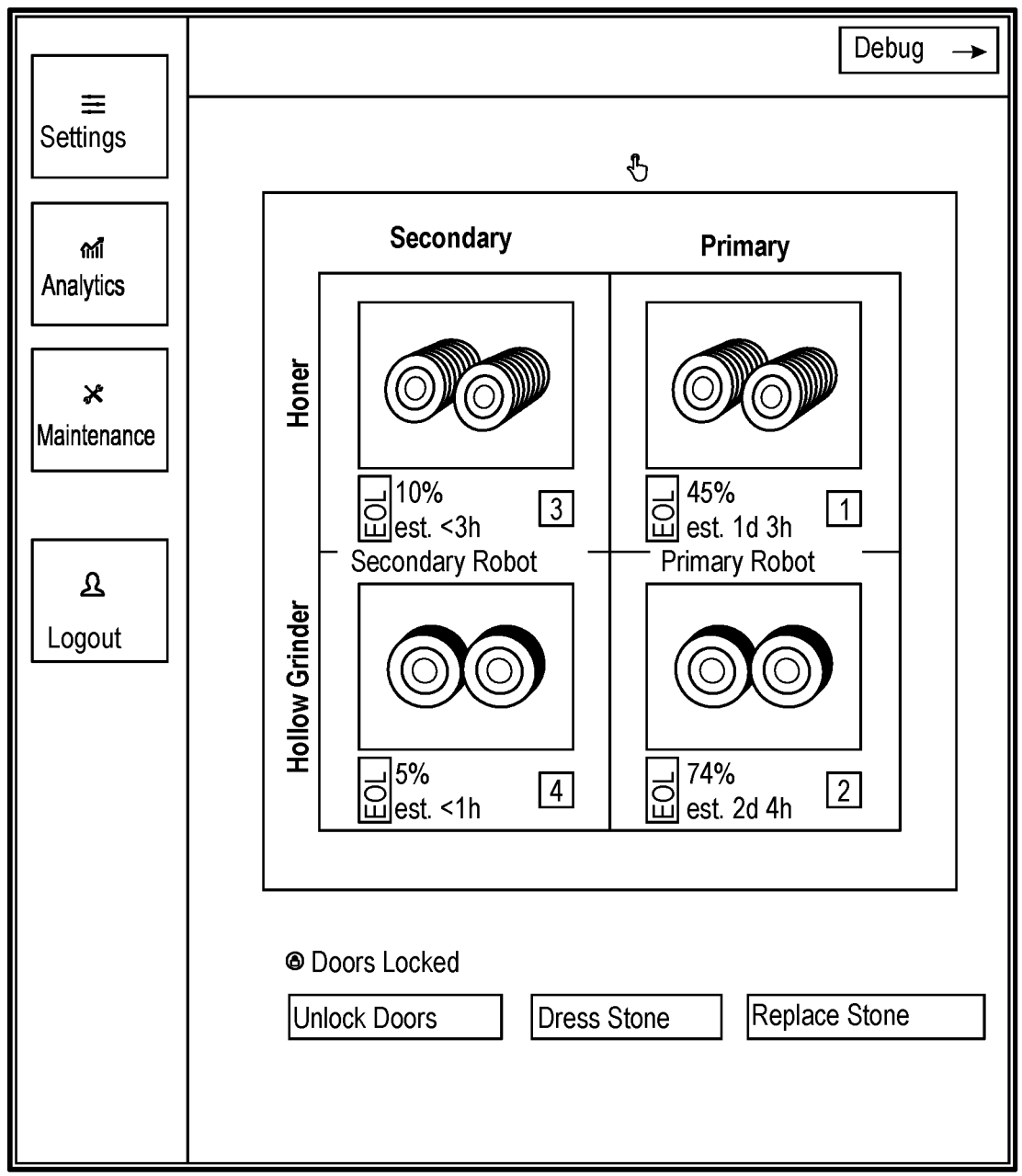
FIG. 22 depicts an illustrative schematic diagram for a user interface, in accordance with one or more example embodiments of the present disclosure.

FIG. 22 depicts an illustrative schematic diagram for a user interface, in accordance with one or more example embodiments of the present disclosure.

Referring to FIG. 22, there is shown an example of user interface 2200 for data analytics, settings, maintenance, debugging, or other data.

In one or more embodiments, the cutting tools and users using the cutting tools may be tracked and monitored through analysis of analytics that is kept in a database. For example, knives will be serialized and given unique serial numbers. The controller may determine the serial number of a knife through either an RFID sensor embedded in the knife handle or a bar code etched into the blade or handle. Knives can be issued to users either on a web-based portal or at the UI on the machine. A user is considered an operator that is using the knives on the packaging floor. A user will use the knives and return them to the machine to be sharpened. The machine will then be able to track the frequency a user is having their knives sharpened. The machine will also be able to keep data on how many times a user damages their knives.

In one or more embodiments, the machines will also be capable of tracking machine usage and utilization. The number of knives being sharpened over a period of time, the amount of time the machine is down for maintenance, or the number of knives that are rejected for a failure mode will be tracked.

In one or more embodiments, the total capacity of knives being sharpened on a particular machine will be tracked. This number can be tracked by how many knives are being sharpened over a given time period. Time periods can be selected such as by the hour, day, or week. The capacity of a particular time period can also be compared to other relevant time periods. For example, compare the total knives sharpened today vs total knives sharpened yesterday.

In one or more embodiments, given that the machine knows each knife type and the serial number of each knife, the analytics can show defect rates between different brands. For example, the data can be filtered to compare the percentage of knives that are chipped from knife manufacturer Type A vs manufacturer Type B. The data can also be filtered to show how many grinds any particular knife took to reach the end of life. That total number of grinds can be compared from knife type to knife type and also from knife manufacturer to manufacturer. In general, any of the analytics of a particular knife can be compared between brands.

In one or more embodiments, any of the defects that are able to be detected can be tracked for analytics. The total number of knives with any particular defect can be compared to any defect. The defects can be filtered based on a time period to see how many knives are being rejected for any particular defect during a given time period.

In one or more embodiments, to track individual user usage trends there will be a web portal or option on the machine touch screen user interface to add a new user. A new user will need to give their unique personal information such as their name. They may also need to fill out the site or facility they work in, the shift they work on and what user level they are. There may be a number of different user levels depending on the complexity of users. At a minimum, there will be basic, advanced, and maintenance users who all will have different permissions and abilities on the machine.

In one or more embodiments, users may be rated based on any number of data items. They may be rated based on the end of life knife tracking where it depends on how long their knives last. This can be used for either the purpose of determining if a user does not send their knife to be sharpened enough or even the opposite if they send their knife to be sharpened too much. A user may also be rated on how often their knives are rejected for defects. A rating system that collects the users' data based on defects and sharpening can be established.

In one or more embodiments, the machine may have the data in the database as to how long users use a knife before it reaches the end of life (EOL). The tracking analytics can display any particular user's average EOL, a particular shift's average EOL, a facility's average EOL, or a whole company's average EOL. The data can also be separated out into specific knife types average EOL. For example, each type of knife that is tracked by the machine may have a different average EOL and tracking user's, shift's, facility's, and company's EOL for any specific knife can be shown. Because the system is tracking the knives' lifetime, the system can order knives from a supplier as knives are due to expire. If users prefer to order knives themselves, the system could send an alert such as an email or text message to notify the purchasing staff of the type of knife to order.

In one or more embodiments, a separate user interface is available for a supervisor or manager to view more detailed machine, shift, knife, and user analytics. This interface may be pulled up on the machine or as a remote interface on a web portal. Any of the data can be exported as a data set to be analyzed separately.

In one or more embodiments, the supervisor/manager view may show the cost analytics of the machine. Since the cost of each knife is known the data for the total cost of knives being rejected for a defect can be shown. Other cost information related to a number of knives being sharpened and discarded is shown.

In one or more embodiments, in the supervisor/manager view the overall machine utilization analytics are displayed through different metrics. The machine Up Time, Knife Throughput, Reject Rate and average Knife end-of-life (EOL) rate is displayed.

In one or more embodiments, machine uptime is the measured amount of time or percentage of time that the machine is consistently sharpening knives. The downtime will be measured as maintenance on the machine or idle time that the machine is not running.

In one or more embodiments, the total knife throughput is the total number of knives that a machine has sharpened during a specific time period. Different time periods (i.e., hour, day, week, month) are selected and the total number of knives sharpened is displayed. The total number of knives rejected for a defect is also displayed as part of the knife throughput.

In one or more embodiments, the rate at which knives are rejected for defects can be tracked based on different criteria. The rate or number of knives being rejected can be tracked by the individual user, by a shift, or by a whole facility. The reject rate can be filtered by different time periods as well. Shifts can also be compared to see which shift has the highest number of rejected knives.

In one or more embodiments, the average end of life rate can be tracked by the individual user, by a shift, or by a whole facility. The average end of life can be reported as the knife life and can be compared from user to user, shift to shift, or facility to facility.

In one or more embodiments, a shift in a facility may have its own unique set of analytics and data that can be tracked for uptime. Knife throughput, rejected rate, and average knife EOL rate.

In one or more embodiments, the user interaction with the machine may be through a touch screen monitor. The touch screen monitor allows a user to start and stop the machine, perform maintenance, view analytics, and debug the machine.

In one or more embodiments, the basic user may use the functions that allow a user to control the system. The user may select a run button to start the process to sharpen knives. A stop button may pause the machine at any point along the sharpening process. An advance button allows them to advance the conveyor forward. A shutdown button may turn off the machine.

In one or more embodiments, a maintenance technician can perform basic maintenance to the machine by accessing the maintenance page on the machine touch screen. In the maintenance mode, they can see the analytics of each of the grinders. The estimated grinding stone life is shown. A maintenance technician can select to replace the stones, unlock doors, or dress the stones.

Figure 23:
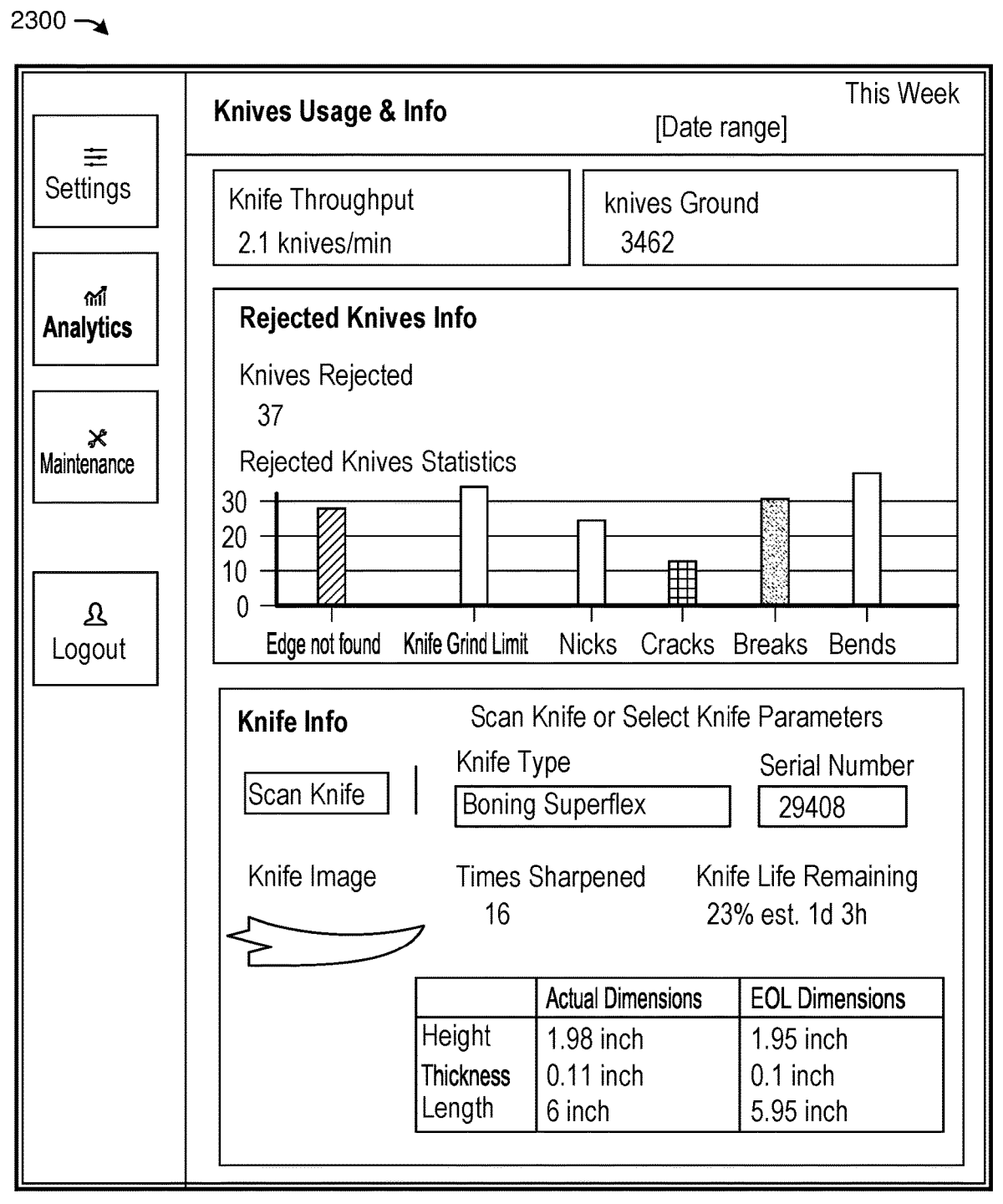

FIG. 23 depicts an illustrative schematic diagram for analytics user interface 2300, in accordance with one or more example embodiments of the present disclosure.

Referring to FIG. 23, there is shown in example analytics page of a user interface associated with cutting tool (e.g., a knife) sharpening.

In one or more embodiments, the manager interaction at the machine touch screen may involve the analytics of the machine. A manager can select the analytics page by selecting the analytics button on the analytics page of the user interface and for a given time period can see the knife throughput, number of knives ground, number of knives rejected, and analytics based on rejected knives. The manager can also select a specific knife by serial number and see corresponding data for that knife. A manager can see how many times a knife has been sharpened, the estimated life left of the knife, and its overall dimensions. It is understood that the above descriptions are for purposes of illustration and are not meant to be limiting.

Figure 24:
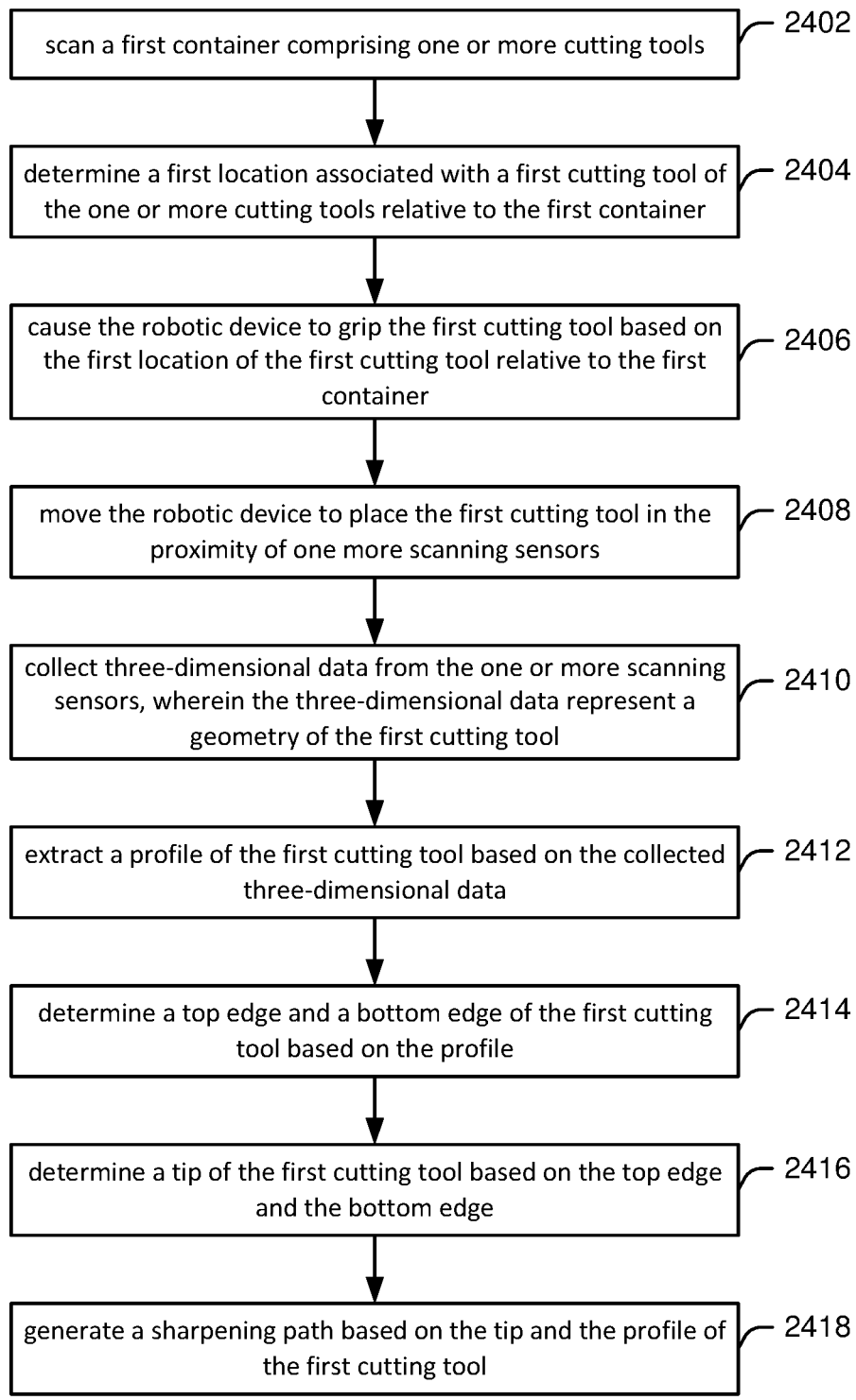
FIG. 24 depicts a flow diagram of an illustrative process for robotic control for a tool sharpening system, in accordance with one or more embodiments of the disclosure.

FIG. 24 depicts a flow diagram of illustrative process 2400 for robotic control for a tool sharpening system, in accordance with one or more embodiments of the disclosure.

At block 2402, a device may scan a first container comprising one or more cutting tools.

At block 2404, the device may determine a first location associated with a first cutting tool of the one or more cutting tools relative to the first container.

At block 2406, the device may cause the robotic device to grip the first cutting tool based on the first location of the first cutting tool relative to the first container.

At block 2408, the device may move the robotic device to place the first cutting tool in the proximity of one more scanning sensors.

At block 2410, the device may collect three-dimensional data from the one or more scanning sensors, wherein the three-dimensional data represent a geometry of the first cutting tool.

The device may cause to partition the profile of the first knife into a plurality of sections using the collected data. The plurality of sections may include a tip, a curved portion, a flat portion, a heel, and a handle. The device may determine a first polynomial curve associated with the top edge. The device may determine a second polynomial curve associated with the bottom edge. The device may associate the tip of the first knife with a global reference space of the robotic device At block 2412, the device may extract a profile of the first cutting tool based on the collected three-dimensional data.

At block 2414, the device may determine a top edge and a bottom edge of the first cutting tool based on the profile.

At block 2416, the device may determine a tip of the first cutting tool based on the top edge and the bottom edge.

At block 2418, the device may generate a sharpening path based on the tip and the profile of the first cutting tool.

An intersection of the first polynomial curve and the second polynomial curve indicates a tip of the first knife. The device may determine an inflection point based on a curvature associated with a section of the plurality of sections. The device may determine a heel polynomial curve associated with a heel of the first knife based on the inflection point. The device may cause the robotic device to move the first knife into a U-shape gauge block to determine whether hollow grinding is needed.

It is understood that the above descriptions are for purposes of illustration and are not meant to be limiting.

Figure 25:
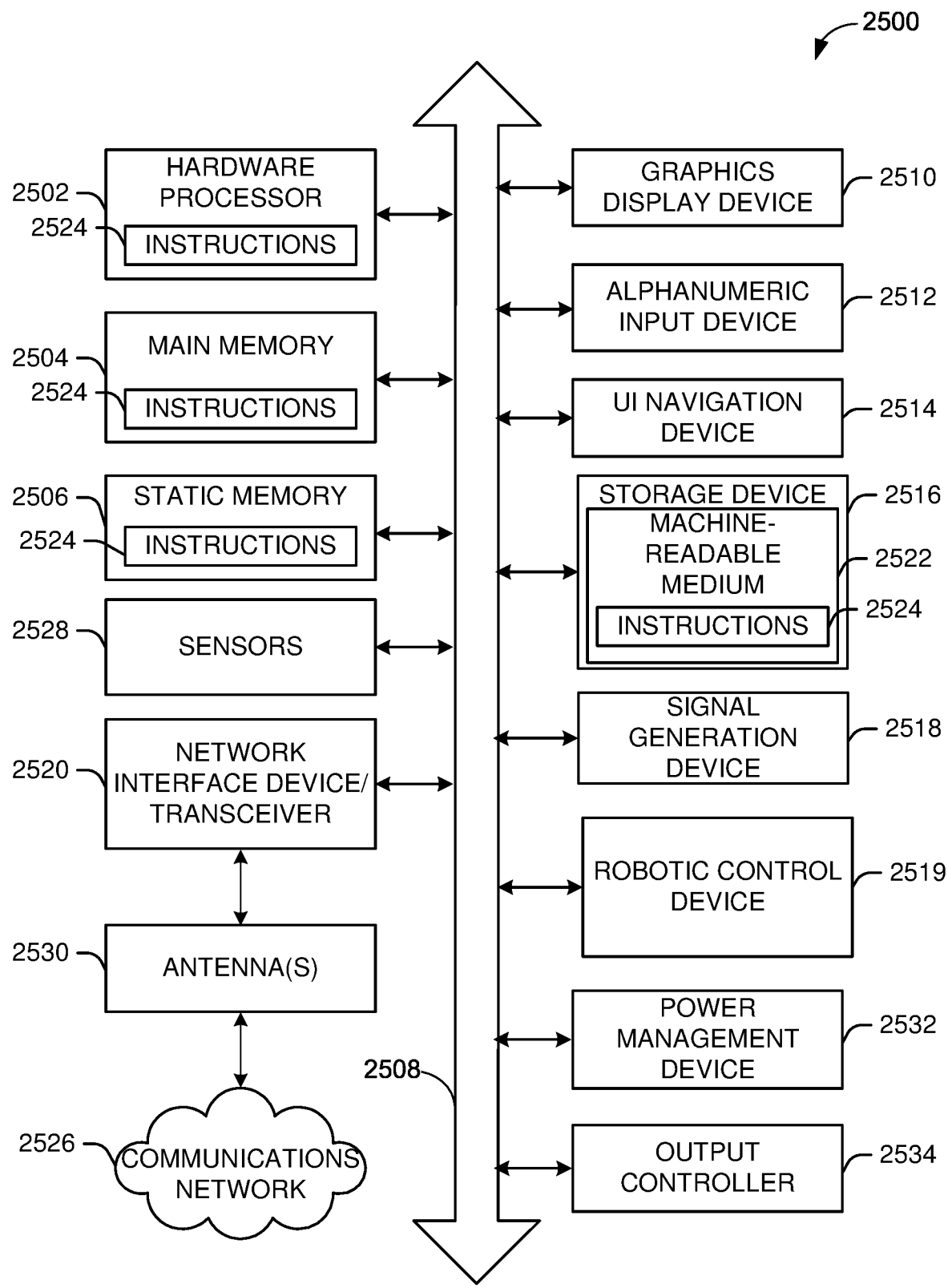
FIG. 25 depicts a block diagram of an example machine upon which any of one or more techniques (e.g., methods) may be performed, in accordance with one or more example embodiments of the present disclosure.

FIG. 25 illustrates a block diagram of an example of a robotic machine 2500 or system upon which any one or more of the techniques (e.g., methodologies) discussed herein may be performed. In other embodiments, the robotic machine 2500 may operate as a stand-alone device or may be connected (e.g., networked) to other machines. In a networked deployment, the robotic machine 2500 may operate in the capacity of a server machine, a client machine, or both in server-client network environments. In an example, the robotic machine 2500 may act as a peer machine in peer-to-peer (P2P) (or other distributed) network environments. The robotic machine 2500 may be any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

Certain embodiments may be implemented in one or a combination of hardware, firmware, and software. Other embodiments may also be implemented as a program code or instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the robotic machine 2500 may include one or more processors and may be configured with program code instructions stored on a computer-readable storage device memory. Program code and/or executable instructions embodied on a computer-readable medium may be transmitted using any appropriate medium including, but not limited to, wireless, wireline, optical fiber cable, RF, etc., or any suitable combination of the foregoing. Program code and/or executable instructions for carrying out operations for aspects of the disclosure may be written in any combination of one or more programming languages, including an object-oriented programming language such as LabVIEW, Java, Smalltalk, C++ or the like, and conventional procedural programming languages, such as the "C" programming language or similar programming languages. The program code and/or executable instructions may execute entirely on a device, partly on the device, as a stand-alone software package, partly on the device and partly on a remote device or entirely on the remote device or server.

The robotic machine 2500 may include at least one hardware processor 2502 (e.g., a central processing unit (CPU), a graphics processing unit (GPU), a hardware processor core, or any combination thereof), a main memory 2504, and a static memory 2506. The robotic machine 2500 may include drive circuitry 2518. The robotic machine 2500 may further include an inertial measurement device 2532, a graphics display device 2510, an alphanumeric input device 2512 (e.g., a keyboard), and a user interface (UI) navigation device 2514 (e.g., a mouse). In an example, the graphics display device 2510, the alphanumeric input device 2512, and the UI navigation device 2514 may be a touch screen display. The robotic machine 2500 may additionally include a storage device 2516, a robotic control device 2519, a network interface device/transceiver 2520 coupled to antenna(s) 2530, and one or more sensors 2528. The robotic machine 2500 may include an output controller 2534, such as a serial (e.g., universal serial bus (USB), parallel, or other wired or wireless (e.g., infrared (IR), near field communication (NFC), etc.) connection to communicate with or control one or more peripheral devices. These components may couple and may communicate with each other through an interlink (e.g., bus) 2508. Further, the robotic machine 2500 may include a power supply device that is capable of supplying power to the various components of the robotic machine 2500. Other components may be included, such as lights or display on a controller device and other modes of point capture (e.g., 2D scanner, vision system, alternating magnetic field, etc.).

The drive circuitry 2518 may include a motor driver circuitry that operates various motors associated with the axes of the robotic machine 2500. Motors may facilitate the movement and positioning of the robotic machine 2500 around the respective axes for a plurality of degrees of freedom (e.g., X, Y, Z, pitch, yaw, and roll). The motor driver circuitry may track and modify the positions around the axes by affecting the respective motors.

The inertial measurement device 2532 may provide orientation information associated with a plurality of degrees of freedom (e.g., X, Y, Z, pitch, yaw, roll, roll rate, pitch rate, yaw rate) to the hardware processor 2502. The hardware processor 2502 may, in turn, analyze the orientation information and generate, possibly using both the orientation information and the encoder information regarding the motor shaft positions, control signals for each motor. These control signals may, in turn, be communicated to motor amplifiers to independently control motors to impart a force on the system to move the system. The control signals may control motors to move a motor to counteract, initiate, or maintain rotation.

The hardware processor 2502 may be capable of communicating with and independently sending control signals to a plurality of motors associated with the axes of the robotic machine 2500.

The storage device 2516 may include a machine-readable medium 2522 on which is stored one or more sets of data structures or instructions 2524 (e.g., software) embodying or utilized by any one or more of the techniques or functions described herein. The instructions 2524 may also reside, completely or at least partially, within the main memory 2504, within the static memory 2506, or within the hardware processor 2502 during execution thereof by the robotic machine 2500. In an example, one or any combination of the hardware processor 2502, the main memory 2504, the static memory 2506, or the storage device 2516 may constitute machine-readable media.

The antenna(s) 2530 may include one or more directional or omnidirectional antennas, including, for example, dipole antennas, monopole antennas, patch antennas, loop antennas, microstrip antennas, or other types of antennas suitable for the transmission of RF signals. In some embodiments, instead of two or more antennas, a single antenna with multiple apertures may be used. In these embodiments, each aperture may be considered a separate antenna. In some multiple-input-multiple-output (MIMO) embodiments, the antennas may be effectively separated for spatial diversity and the different channel characteristics that may result between each of the antennas and the antennas of a transmitting station.

It is understood that the above are only a subset of what the robotic control device 2519 may be configured to perform and that other functions included throughout this disclosure may also be performed by the robotic control device 2519.

While the machine-readable medium 2522 is illustrated as a single medium, the term "machine-readable medium" may include a single medium or multiple media (e.g., a centralized or distributed database, and/or associated caches and servers) configured to store the one or more instructions 2524.

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM), random-access memory (RAM), magnetic disk storage media; optical storage media' a flash memory, etc.

The term "machine-readable medium" may include any medium that is capable of storing, encoding, or carrying instructions for execution by the robotic machine 2500 and that causes the robotic machine 2500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 2524 may further be transmitted or received over a communications network 2526 using a transmission medium via the network interface device/transceiver 2520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, and peer-to-peer (P2P) networks, among others. In an example, the network interface device/transceiver 2520 may include one or more physical jacks (e.g., Ethernet, coaxial, or phone jacks) or one or more antennas (e.g., antennas 2530) to connect to the communications network 2526. In an example, the network interface device/transceiver 2520 may include a plurality of antennas to wirelessly communicate using at least one of single-input-multiple-output (SIMO), multiple-input-multiple-output (MIMO), or multiple-input-single-output (MISO) techniques. The term "transmission medium" shall be taken to include any intangible medium that is capable of storing, encoding, or carrying instructions for execution by the robotic machine 2500 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used within this document, the term "communicate" is intended to include transmitting, receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a single input single output (SISO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

The following examples pertain to further embodiments.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations. Certain aspects of the disclosure may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system."

The computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method comprising:
   scanning, by one or more processors, a container comprising one or more cutting tools;
   tracking defects of the one or more cutting tools;
   determining a location associated with a cutting tool of the one or more cutting tools relative to the container;
   causing a robotic device to grip the cutting tool based on the location of the cutting tool relative to the container;
   associating a user with at least one cutting tool of the one or more cutting tools;
   incorporating a user-rating system based on longevity and defect rejection rates of the at least one cutting tool of the one or more cutting tools;
   causing to move the robotic device to place the cutting tool in proximity of one or more scanning sensors and a set of grinding stones;
   collecting three dimensional data from the one or more scanning sensors, wherein the three dimensional data represents a geometry of the cutting tool;
   extracting a profile of the cutting tool based on the collected three dimensional data;
   determining, by one or more force-torque sensors, an amount of force to be applied to the cutting tool; and
   generating a sharpening path based on a tip and the profile of the cutting tool.

2. The method of claim 1, further comprising:
   determining a top edge and a bottom edge of the cutting tool based on the profile;
   determining the tip of the cutting tool based on the top edge and the bottom edge; and
   generating the sharpening path based on the tip and the profile of the cutting tool.

3. The method of claim 1, further comprising:
   causing, via a conveyor, to move the container to place the container in proximity of the robotic device.

4. The method of claim 1, wherein the force-torque sensor is configured to sense forces and torques in three axes.

5. The method of claim 1, further comprising:
   determining a predetermined value registered by the one or more force-torque sensors, associated with lowering the cutting tool;
   lowering the cutting tool; and
   pausing the lowering of the cutting tool when the one or more force-torque sensors registers the predetermined value.

6. The method of claim 1, further comprising:
   causing the robotic device to move along the sharpening path; and
   maintaining the amount of force as the robotic device moves along the sharpening path.

7. The method of claim 6, further comprising:
   detecting a deviation from the amount of force as the robotic devices moves along the sharpening path; and
   applying, by the robotic device, a torque based at least on a control algorithm.

8. The method of claim 1, further comprising:
   determining, based at least in part on the collected three dimensional data, that a thickness of the cutting tool is greater than a predetermined threshold; and
   removing, by a hollow grinding device, a concave portion from the cutting tool.

9. A non-transitory computer-readable medium storing computer-executable instructions which when executed by one or more processors result in performing operations comprising:
   scanning, by one or more processors, a container comprising one or more cutting tools;
   tracking defects of the one or more cutting tools;
   determining a location associated with a cutting tool of the one or more cutting tools relative to the container;
   causing a robotic device to grip the cutting tool based on the location of the cutting tool relative to the container;
   associating a user with at least one cutting tool of the one or more cutting tools;
   incorporating a user-rating system based on longevity and defect rejection rates of the at least one cutting tool of the one or more cutting tools;
   causing to move the robotic device to place the cutting tool in proximity of one or more scanning sensors and a set of grinding stones;
   collecting three dimensional data from the one or more scanning sensors, wherein the three dimensional data represents a geometry of the cutting tool;

extracting a profile of the cutting tool based on the collected three dimensional data;

determining, by one or more force-torque sensors, an amount of force to be applied to the cutting tool; and generating a sharpening path based on a tip and the profile of the cutting tool.

10. The non-transitory computer-readable medium of claim 9, wherein the operations further comprise:

determining a top edge and a bottom edge of the cutting tool based on the profile;

determining the tip of the cutting tool based on the top edge and the bottom edge; and generating the sharpening path based on the tip and the profile of the cutting tool.

11. The non-transitory computer-readable medium of claim 9, wherein the operations further comprise:

causing, via a conveyor, to move the container to place the container in proximity of the robotic device.

12. The non-transitory computer-readable medium of claim 9, wherein the force-torque sensor is configured to sense forces and torques in three axes.

13. The non-transitory computer-readable medium of claim 9, wherein the operations further comprise:

determining a predetermined value registered by the one or more force-torque sensors, associated with lowering the cutting tool;

lowering the cutting tool; and pausing the lowering of the cutting tool when the one or more force-torque sensors registers the predetermined value.

14. The non-transitory computer-readable medium of claim 9, wherein the operations further comprise:

causing the robotic device to move along the sharpening path; and maintaining the amount of force as the robotic device moves along the sharpening path.

15. The non-transitory computer-readable medium of claim 14, wherein the operations further comprise:

detecting a deviation from the amount of force as the robotic devices moves along the sharpening path; and applying, by the robotic device, a torque based at least on a control algorithm.

16. The non-transitory computer-readable medium of claim 9, wherein the operations further comprise:

determining, based at least in part on the collected three dimensional data, that a thickness of the cutting tool is greater than a predetermined threshold; and removing, by a hollow grinding device, a concave portion from the cutting tool.

17. A device, the device for sharpening a cutting tool using a robotic device, wherein the device comprises processing circuitry coupled to storage, the processing circuitry configured to:

scan, by one or more processors, a container comprising one or more cutting tools;

track defects of the one or more cutting tools;

determine a location associated with a cutting tool of the one or more cutting tools relative to the container;

cause a robotic device to grip the cutting tool based on the location of the cutting tool relative to the container;

associating a user with at least one cutting tool of the one or more cutting tools;

incorporate a user-rating system based on longevity and defect rejection rates of the at least one cutting tool of the one or more cutting tools;

cause to move the robotic device to place the cutting tool in proximity of one or more scanning sensors and a set of grinding stones;

collect three dimensional data from the one or more scanning sensors, wherein the three dimensional data represents a geometry of the cutting tool;

extract a profile of the cutting tool based on the collected three dimensional data;

determine, by one or more force-torque sensors, an amount of force to be applied to the cutting tool; and generate a sharpening path based on a tip and the profile of the cutting tool.

18. The device of claim 17, wherein the processing circuitry is further configured to:

cause, via a conveyor, to move the container to place the container in proximity of the robotic device.

19. The device of claim 17, wherein the processing circuitry is further configured to:

cause the robotic device to move along the sharpening path;

maintain the amount of force as the robotic device moves along the sharpening path, detect a deviation from the amount of force as the robotic devices moves along the sharpening path; and apply, by the robotic device, a torque based at least on a control algorithm.

20. The device of claim 17, wherein the processing circuitry is further configured to:

determine, based at least in part on the collected three dimensional data, that a thickness of the cutting tool is greater than a predetermined threshold; and remove, by a hollow grinding device, a concave portion from the cutting tool.

* * * * *